United States Patent [19]
Yamaguchi et al.

[11] Patent Number: 5,820,052
[45] Date of Patent: Oct. 13, 1998

[54] SPINNING REEL FOR FISHING HAVING A SUPPORT ARM WITH A SUPPORT MEMBER MOUNTING PORTION

[75] Inventors: Akira Yamaguchi, Saitama; Masatoshi Katayama; Eiji Shinohara, both of Tokyo, all of Japan

[73] Assignee: Daiwa Seiko, Inc., Tokyo, Japan

[21] Appl. No.: 780,227

[22] Filed: Jan. 8, 1997

[30] Foreign Application Priority Data

| Jan. 10, 1996 | [JP] | Japan | 8-002178 |
| Jan. 11, 1996 | [JP] | Japan | 8-003026 |
| Mar. 21, 1996 | [JP] | Japan | 8-064500 |
| Jun. 14, 1996 | [JP] | Japan | 8-154345 |

[51] Int. Cl.$^6$ .................................................. A01K 89/01
[52] U.S. Cl. .................................................. 242/232
[58] Field of Search .......................... 242/230, 231, 242/232, 233

[56] References Cited

U.S. PATENT DOCUMENTS

| 5,193,762 | 3/1993 | Takeuchi | 242/232 |
| 5,368,247 | 11/1994 | Young et al. | 242/231 |
| 5,379,958 | 1/1995 | Takeuchi | 242/232 |
| 5,661,508 | 8/1997 | Tsutsumi | 242/231 |

FOREIGN PATENT DOCUMENTS

| 0 456 262 A1 | 11/1991 | European Pat. Off. . |
| 0 689 765 A1 | 1/1996 | European Pat. Off. . |
| 3-74259 | 3/1991 | Japan . |
| 4-43017 | 10/1992 | Japan . |

*Primary Examiner*—Katherine Matecki
*Attorney, Agent, or Firm*—Sughrue, Mion, Zinn, Macpeak & Seas, PLLC

[57] ABSTRACT

In a spinning reel for fishing, on a leading end side of a support arm provided in a rotor, there is formed a mounting portion for mounting a support member including a fishing line guide member by combination of the support arm and a cover member mounted on the support arm, and a base portion of the support member is journaled on the mounting portion, so that the support member can be reversed between its fishing line take-up and play-out positions. The spinning reel can prevent a fishing line from being entangled during fishing operation, and can increase the diameter of a spool without increasing the size of the whole reel.

15 Claims, 21 Drawing Sheets

SPINNING REEL FOR FISHING HAVING A SUPPORT ARM WITH A SUPPORT MEMBER MOUNTING PORTION

BACKGROUND OF THE INVENTION

The present invention relates to a spinning reel for fishing which can prevent a fishing line from become entangled on the spinning reel during fishing operation and permits a spool to be increased in diameter without increasing the size of the entire spinning reel.

As shown in Japanese Utility Model Publication No. 4-43017 or in FIG. 34, in most of conventional spinning reels 1 for fishing, a semiannular-shaped bail 7 is mounted on the leading end portions of a pair of support arms 5 provided in a rotor 3 through two bail support members 9 and 11. The bail support members 9 and 11 are switchingly urged to and held at their respective fishing line take-up and play-out positions by a reversal control device 15 which is installed within the storage portion 13 of the support arm 5.

In such spinning reel 1, if the bail 7 is turned down to its fishing line play-out position and the terminal tackles of the fishing rod are thrown out, then a fishing line wound around a spool 17 is played out in a spiral manner. On the other hand, if the bail 7 is returned to its fishing line take-up position and the rotor 3 is rotated in a fishing line take-up direction by operating a handle 19, then the fishing line can be wound around the spool 17 which reciprocates in the longitudinal direction thereof in conjunction with the rotation of the rotor 3.

However, as shown in FIG. 34, in the above spinning reel 1, since the bail support members 9 and 11 are pivotably supported on the support arms 5 in such a manner that they project greatly outwardly of a cover 21 covering the storage portions 13, the support arms 5 (including the bail support members 9 and 11) is increased in thickness and thus in size, and the fishing line is likely to become entangled around the bail support members during the fishing operation of the spinning reel 1.

Also, in Japanese Utility Model Publication No. 3-14259, there is disclosed a spinning reel 33 in which, as shown in FIG. 35, two fitting grooves 27 are respectively formed in the front peripheral portions of a pair of support arms 25 provided in a rotor 23. Two bail support members 29 and 31 are respectively fitted to the fitting grooves 27 while being returnably journaled on the support arms 25, and the outer surfaces of the mutually connecting portions of the bail support members 29, 31 and support arms 25 are formed in such a manner that they are almost flush with each other.

The structure of the spinning reel 33 provides an advantage in that the bail support members 29 and 31 are prevented from projecting radially outwardly from the respective outside surfaces of the support arms 25. However, the fishing line may still be caught in or bite into clearances between mutually opposing portions, i.e. the leading end portions 25*a* of the support arms 25 and the stepped portions 29*a*, 31*a* of the bail support members 29, 31, during the fishing operation.

Further, since the fitting grooves 27 to be fitted with the bail support members 29 and 31 are formed in the respective front peripheral portion s of the support arms 25, a drawback is pointed out in that the thicknesses of the support arms 25 themselves are increased, thereby increasing the outside width dimension L of the support arms 25.

In general, if the diameter of the spool is increased in a spinning reel, this provides advantages in that the permanent deformation (which is likely to makes the fishing line looped or spiral, not straight) is hardly imparted on the fishing line and that a thumbing operation onto the spool can be carried out easily and smoothly. However, in the spinning reel 33, as shown in FIG. 35 in which the support arms 25 themselves are increased in size, if the diameter of the spool 35 is increased for these advantages, then the rotor and the support arms must be further increased in diameter and size. Consequently the entire reel is increased in size and weight, which hinders the smooth fishing operation.

SUMMARY OF THE INVENTION

The present invention aims at eliminating the drawbacks found in the above-mentioned conventional spinning reels. Accordingly, it is an object of the invention to provide a spinning reel for fishing which can prevent a fishing line from becoming entangled during the fishing operation of the spinning reel. Another object of the present invention is to provide a spinning reel for fishing which permits the diameter of a spool to be increased without increasing the size of the entire spinning reel.

In order to attain the above-noted and other objects, the present invention provides a spinning reel for fishing for winding a fishing line onto a spool with a rotor rotatable about an axis, wherein:

the spool includes a front side flange portion, a fishing line winding barrel portion and a rear side flange portion opposite from the front side flange portion with respect to the fishing line winding barrel portion along the axis;

the fishing line winding barrel portion is tapered at an angle of 0.5° a to 5° with respect to the axis so that a diameter of the fishing line winding barrel portion gradually decreases from the front side flange portion to the rear side flange portion; and an axial length of the rear side flange portion along the axis is larger than an axial length of the fishing line winding barrel portion.

The present invention further provides a spinning reel for fishing for winding a fishing line onto a spool with a rotor rotatable about an axis, wherein:

the spool includes a front side flange portion, a fishing line winding barrel portion and a rear side flange portion opposite from the front side flange portion with respect to the fishing line winding barrel portion along the axis;

the fishing line winding barrel portion is tapered with respect to the axis so that a diameter of the fishing line winding barrel portion gradually decreases from the front side flange portion to the rear side flange portion; and a rear end of the rear side flange portion is tapered so that a diameter of the rear end is gradually decreases rearwardly.

The present invention further provides a spinning reel for fishing for winding a fishing line onto a spool with a rotor rotatable about an axis, wherein:

the spool includes a front side flange portion, a fishing line winding barrel portion and a rear side flange portion opposite from the front side flange portion with respect to the fishing line winding barrel portion along the axis;

the rotor includes a pair of support arms located diametrically opposite from each other with respect to the axis;

a diameter of the front side flange portion relative to a distance defined between outer surfaces of the support arms is set at 0.6to 0.8; and a rear end of the rear side flange portion is tapered so that a diameter of the rear end is gradually decreases rearwardly.

The present invention further provides a spinning reel for fishing for winding a fishing line onto a spool with a rotor rotatable about an axis, wherein:

the spool includes a front side flange portion, a fishing line winding barrel portion and a rear side flange portion opposite from the front side flange portion with respect to the fishing line winding barrel portion along the axis; and a diameter of the rear side flange portion relative to a diameter of the front Bide flange portion is set at 0.95 to 1.05.

The present invention further provides a spinning reel for fishing for winding a fishing line onto a spool with a rotor rotatable about a first axis, wherein:

the rotor includes a pair of support arms and a cover is attached to at least one of the support arms;

said at least one of support arms and said cover cooperatively form a mounting portion for pivotably mounting a base portion of a support member to which a bail is fixed;

an imaginary plane is defined, which contains the first axis and intersects both the support arms;

a peripheral wall is erected from and elongated along a peripheral edge of the mounting portion so that the peripheral wall adjacent the base portion of the support member extends from a fishing line take-up side across the imaginary plane to a fishing line play-out side; and the peripheral wall defines a cut-out portion which permits a pivot motion of the support arm and which is entirely located within the fishing line play-out side.

The present invention further provides a spinning reel for fishing for winding a fishing line onto a spool with a rotor rotatable about a first axis, wherein:

the rotor includes a pair of support arms;

a support shaft i n formed on and protrudes from an inner surface of at least one of the support arms for mounting a base portion of a support member to which a bail is fixed so that the support member is pivotable about a second axis;

an imaginary plane is defined, which contains the first axis and intersects both the support arms;

a peripheral wall is erected from and elongated along a peripheral edge of said at least one of the support arms so that the peripheral wall has a curved front wall which circumscribes the base portion of the support member about the second axis and terminates substantially on the imaginary plane to define a cut-out portion entirely located within a fishing line play-out side with respect to the imaginary plane.

The present invention further provides a spinning reel for fishing for winding a fishing line onto a spool with a rotor rotatable about a first axis, wherein:

the rotor includes a pair of support arms, and a cover attached to at least one of the support arms;

a support shaft is formed on and protrudes from an inner surface of said cover for mounting a base portion of a support member to which a bail is fixed so that the support member is pivotable about a second axis;

an imaginary plane is defined, which contains the first axis and intersects both the support arms;

a peripheral wall is erected from and elongated along a peripheral edge of said cover so that the peripheral wall has a curved front wall which circumscribes the base portion of the support member about the second axis and terminates substantially on the imaginary plane to define a cut-out portion entirely located within a fishing line play-out side with respect to the imaginary plane.

Many advantages obtained from these designs for the spinning reel according to the present invention are disclosed hereafter in detail with reference to the accompanying drawings.

DETAILED DESCRIPTION OF THE PREFERRED EMBODIMENTS

Now, description will be given below in detail of embodiments of a spinning reel for fishing according to the invention with reference to the accompanying drawings.

Figure 1:
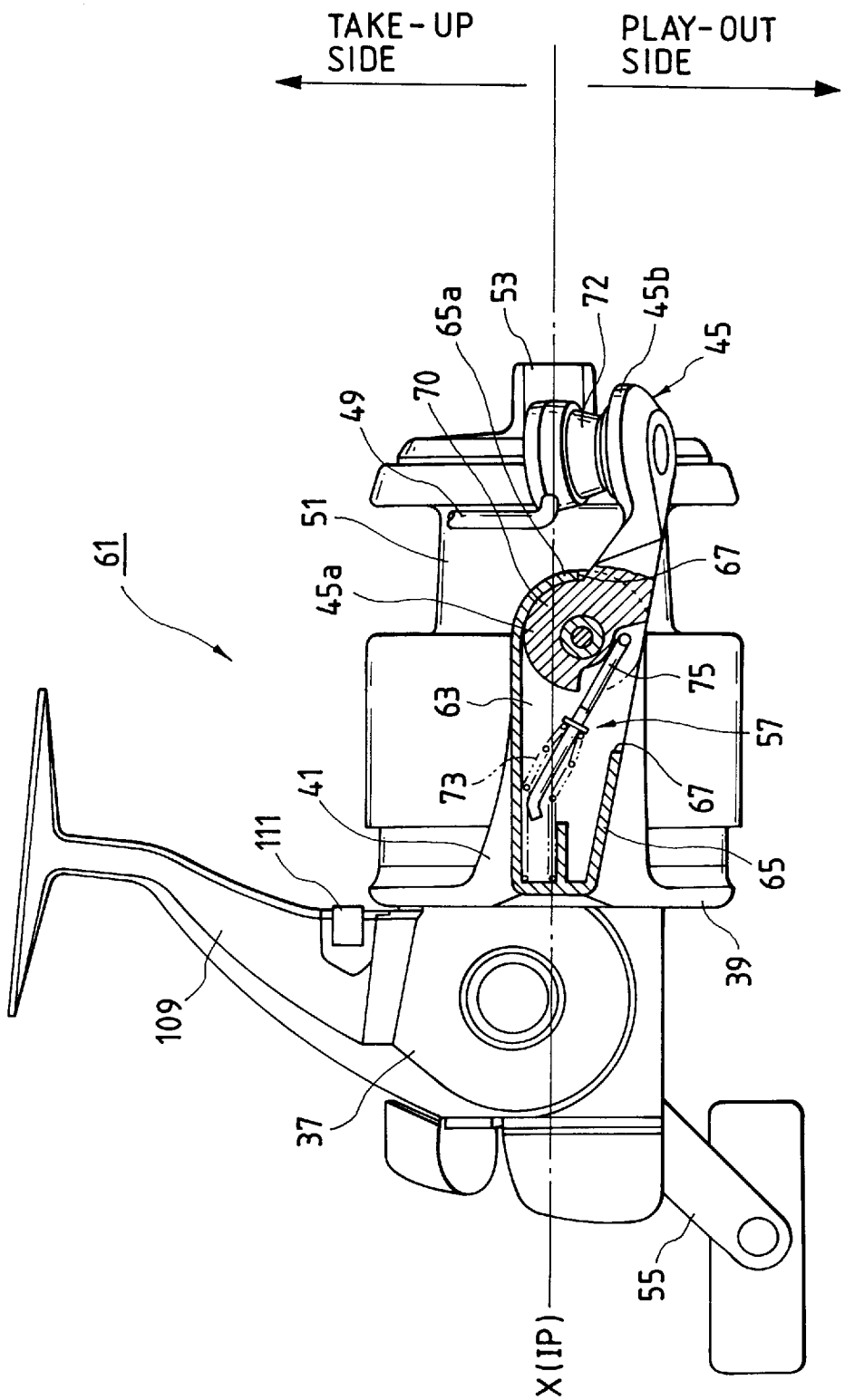
FIG. 1 is a side view, partly in section, of the main portions of a first embodiment of a spinning reel according to the invention.

FIG. 1 shows a first embodiment of a spinning reel according to the invention. In FIG. 1, reference character 37 designates a reel main body. A rotor 39 is rotatably journaled on the front end of the reel main body 37. As shown in FIGS. 2 to 5, the rotor 39 includes a pair of support arms 41 and 43 which are respectively formed integral with the rotor 39 and extend in the longitudinal direction of the reel main body 37. Two bail support members 45 and 47 are rotatably mounted on the respective leading end portions of the support arms 41 and 43. A semiannular-shaped bail 49 is mounted between the two bail support members 45 and 47.

Also, on the reel main body 37, there is mounted a spool 51 coaxially with the rotor 39. The spool 51 is rotatably supported on a spool shaft which is mounted in the reel main body 37 in such a manner that it can traverse. The spool 51 and spool shaft are frictionally coupled to each other by a drag device which is incorporated in the spool 51. The drag force of the drag device can be adjusted by operating a knob 53 which is attached to the front end portion of the spool 51.

Further, on the reel main body 37, there is installed a handle 55 which is used to take up a fishing line. The rotary shaft of the handle 55 is linked with the rotor 39 through a well-known gear mechanism provided within the reel main body 37. The spool shaft is linked with the rotary shaft of the handle 55 through a well-known traverse mechanism.

Figure 2:
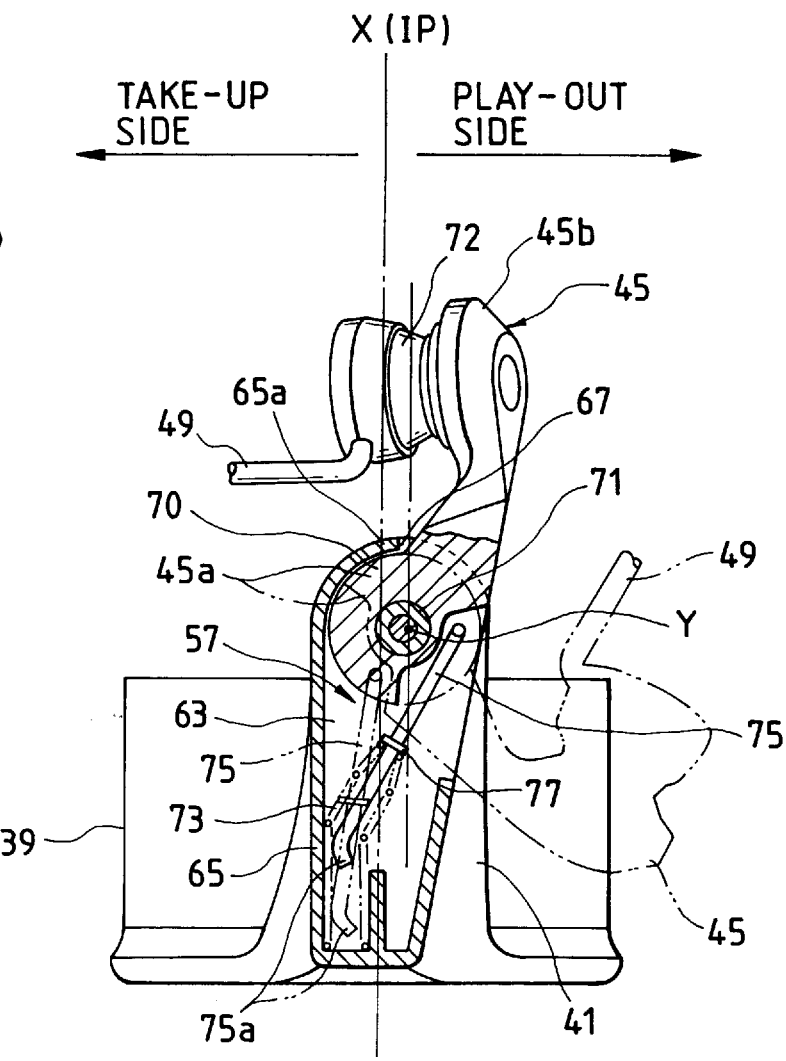
FIG. 2 is a side view, partly in section, of the main portions of a rotor, showing a mounting structure and an urging structure for a bail support member provided in the spinning reel shown in FIG. 1.
Figure 4:
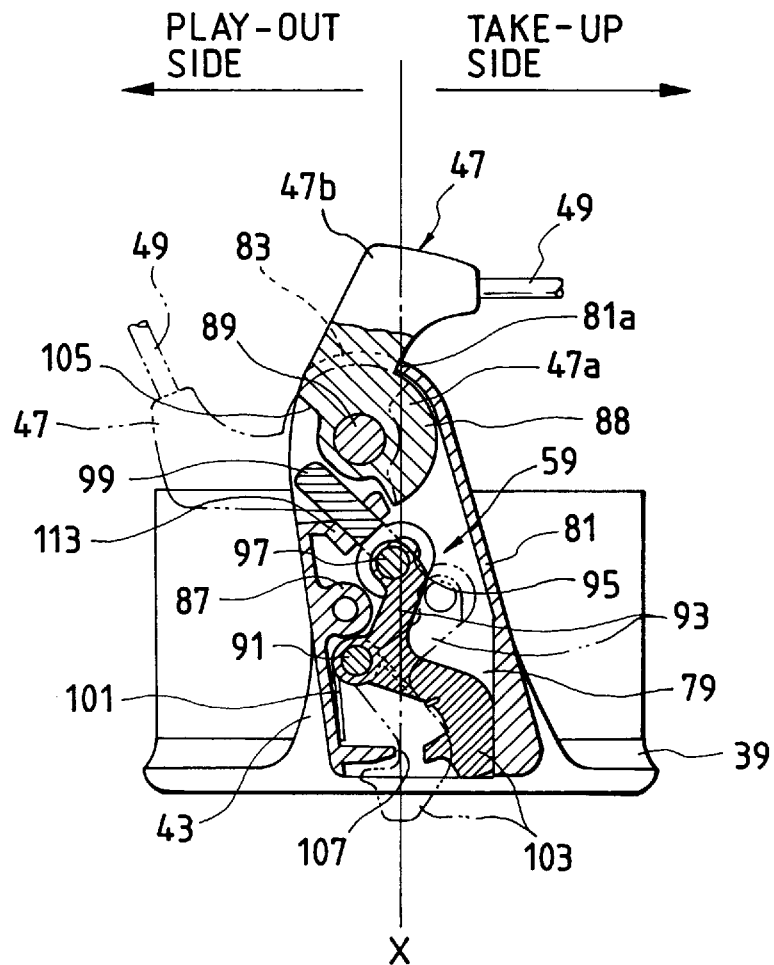
FIG. 4 is a side view, partly in section, of the main portions of a rotor, showing a mounting structure and a returning structure for the other bail support member provided in the spinning reel shown in FIG. 1.

The bail support members 45 and 47 are urged switchingly to and held at their respective fishing line take-up positions and play-out positions, respectively shown by solid lines and two-dot chained lines in FIGS. 2 and 4, by an urging device 57 which is installed in the support arm 41. The bail support members 45 and 47 held at their respective fishing line play-out positions can be reversed and returned to their respective fishing line take-up positions by a return device 59 which is installed in the support arm 43. After the bail 49 is reversed to its fishing line take-up position, if the rotor 39 is rotated in the fishing line take-up direction by operating the handle 55, then the fishing line can be wound around the spool 51 which is allowed to traverse (reciprocate) in conjunction with the rotation of the rotor 39.

Figure 3:
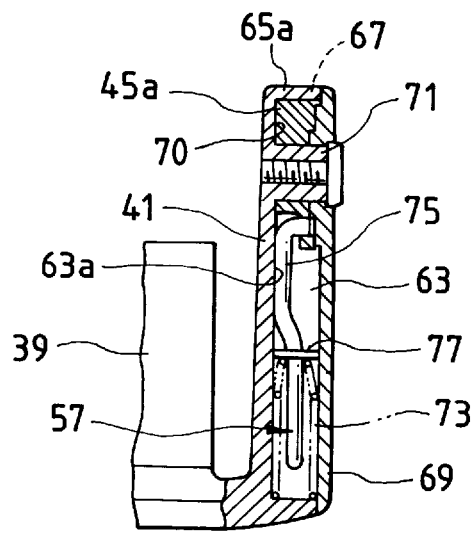
FIG. 3 is a section view of a support arm provided in the rotor shown in FIG. 2.

FIGS. 2 and 3 show the details of a mounting structure for mounting the bail support member 45 and the details of the urging device 57. In FIGS. 2 and 3, reference character 63 designates a recess-like storage portion for storing and mounting the urging device 57. In particular, the storage portion 63 is formed in such a manner that it is enclosed by a peripheral wall 65 erected along the peripheral edge portion of the support arm 41. A cut-out portion 67 is formed in the peripheral wall 65, which extends over a reversal range for the bail support member 45. The peripheral wall 65 further includes a front wall 65a which is extended up to the leading end portion of the support arm 41. More specifically, the peripheral wall 65 is erected from and elongated along a peripheral edge portion of the support arm 41 so that the peripheral wall 65 adjacent the base portion 45a of the support member 45 extends from a fishing line take-up side across an imaginary plane IP to a fishing line play-out side. The imaginary plane IP is a plane which contains therein an axis X of the rotor 39 and intersects both the support arms 41 and 43 (see, for instance, FIG. 39). In this embodiment, the peripheral wall 65 terminates at a location substantially aligned on a pivot axis Y of the support member 45 along a direction of the axis X of the rotor 39. Therefore, the cut-out portion 67 through which the support member 45 can make the pivot motion is completely located within the fishing line play-out side with respect to the axis X of the rotor 39. This design, that the peripheral wall 65 extends up to the fishing line play-out side from the fishing line take-up side at a location adjacent to the bail support member 45, positively protects the fishing line from being entangled on the support arm 41 and the bail support member 45.

Figure 39:
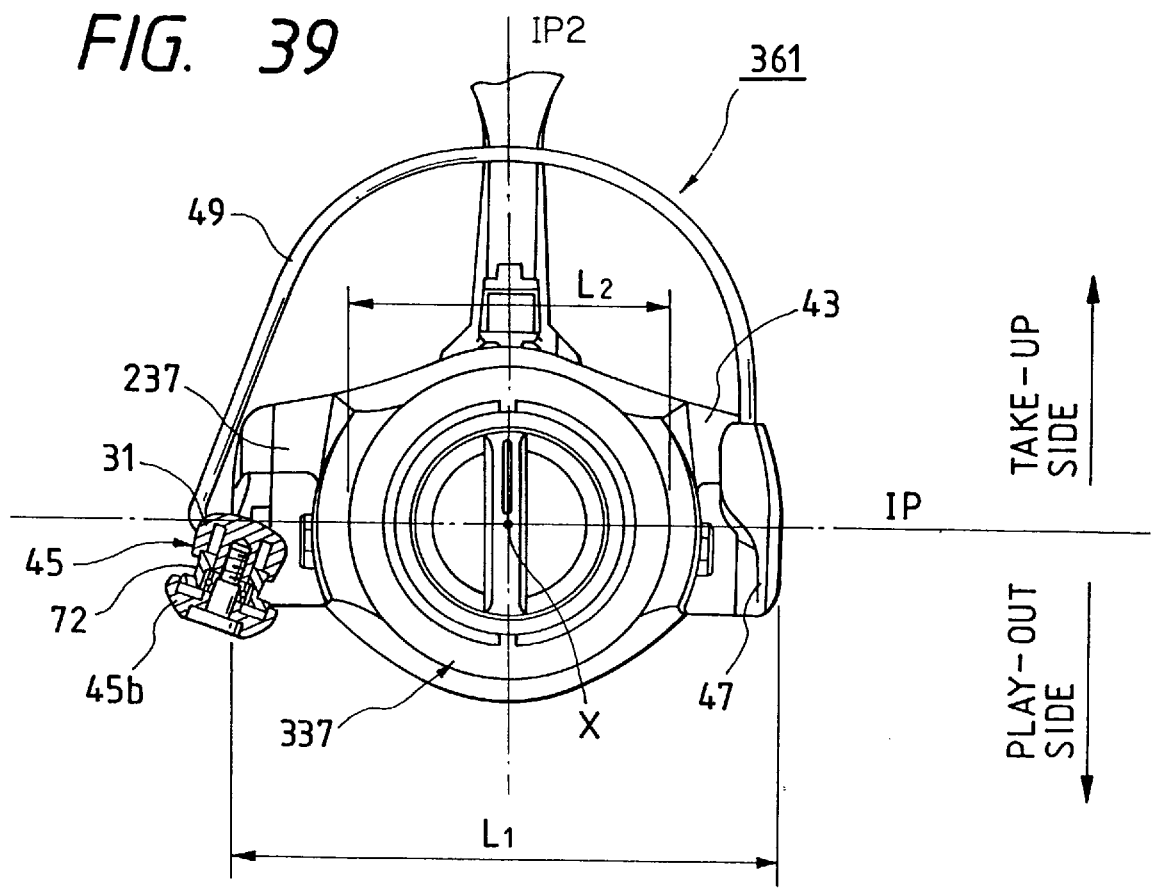
FIG. 39 is a front view, partially in section, of the spinning reel for fishing shown in FIG. 38.

In the particular position of the rotor shown in FIG. 39, for example, a second imaginary plane IP2 is shown bisecting the spinning reel, including the rotor, into two substantially symmetrical halves. The first imaginary plane IP actually illustrated in FIG. 39 extends perpendicularly relative to the second imaginary plane IP2.

Also, reference numeral 69 stands for a cover which is used to cover the whole of the storage portion 63. In the present embodiment, the cover 69 and support arm 41 cooperate in forming a mounting portion 70 on the leading end side of the support arm 41 for mounting the bail support member 45. The over 69 is screwed to a cylindrical-shaped support shaft 71 erected on the inner surface 63a of the storage portion 63. The base portion 45a of the bail support member 45 is journaled on the support shaft 71.

In order to prevent the entanglement of the fishing line during the fishing operation, the bail support member 45 is formed in such a manner that it has a smooth outer shape over an area ranging from the leading end portion 45b thereof, on which a line roller (a fishing line guide member) 72 is to be mounted, to the base portion 45a thereof. As shown in FIG. 3, the base portion 45a of the bail support member 45 is formed in a flat shape having a small thickness which not only permits the base portion 45a to be inserted into the cut-out portion 67 and but also prevents the base portion 45a from projecting outwardly from the support arm 41 in the width direction. That is, according to the present embodiment, owing to the structure that the base portion 45a of the bail support member 45 is formed in a thin and flat shape in this manner and is journaled on the support shaft 71, the support arm 41 itself can be reduced in thickness. Further, owing to the structure that the base portion 45a is covered with the cover 69 and the bail support member 45 is formed as a smooth outer shape, it is possible to prevent the entanglement of the fishing line. Moreover, since the base end portion 45a of the bail support member 45 is formed as the flat and thin plate configuration, since the base end portion 45a is arranged in surface contact with inner surfaces of the support arms 41 and cover 69, and since portions of the cut-out portion 67 with which the bail support member 45 is slidingly contacted are made flush with the inner surface of the support arms 41 and cover 69, respectively, it is possible to reduce the thickness of the support arm 45.

The urging device 57 is a conventionally well known device in which, ,as shown in FIG. 2, a coil spring 73 is provided in the storage portion 63 in such a manner that it is offset to one side of the storage portion 63 and extends from the base end portion of the storage portion 63 toward the leading end portion thereof. An operation rod 75, which is formed in a substantially linear shape and is engaged with the base portion 45a of the bail support member 45, is inserted into the coil spring 73 from the leading end of the coil spring 73. The upper end of the coil spring 73 is engaged with a securing portion 77 which is formed in the intermediate portion of the operation rod 75, and, due to the biasing or urging action of the coil spring 73 using a dead point action, the bail support member 45 is urged to the fishing line play-out position with a strong force and to the fishing line take-up position with a weak force. The lower end 75a of the operation rod 75 is slightly curved for smooth guide action.

Figure 5:
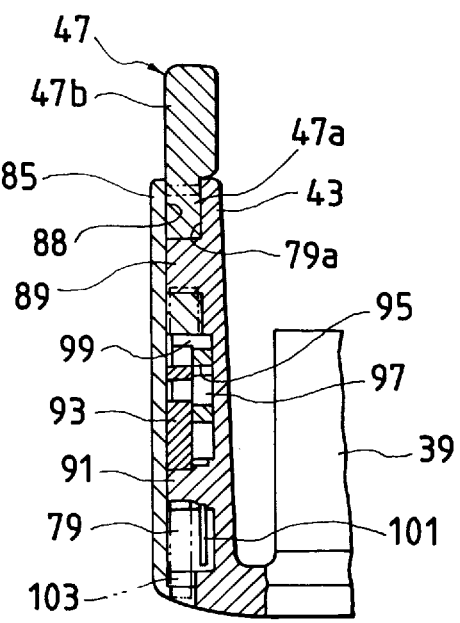
FIG. 5 is a section view of a support arm provided in the rotor shown in FIG. 4.

On the other hand, FIGS. 4 and 5 show the details of a mounting structure for mounting the bail support member 47 and the details of the return device 59. In FIGS. 4 and 5, reference character 79 designates a storage portion for storing and mounting the return device 59. The present storage portion 79 is similarly formed in such a manner that it is enclosed by a peripheral wall 81 erected along the peripheral edge portion of the support arm 43. There is formed in the peripheral wall 81 a cut-out portion 63 in such a manner that it extends over a reversal area for the bail support member 47. More specifically, as shown in FIG. 4, the peripheral wall 81 includes a cut-out portion 83 which is so formed in the peripheral wall 81 as to extend over a reversal area ranging from the fishing line take-up position of the bail support member 47 to the fishing line play-out position of the bail support member 47. The peripheral wall 81 further includes a front wall 81a which extends up to the leading end portion of the support arm 43. The peripheral wall 81 is erected from and elongated along a peripheral edge portion of the support arm 43 so that the peripheral wall 81 terminates at a location substantially aligned on the imaginary plane IP. Therefore, the cut-out portion 83 through which the support member 47 can make the pivot motion is completely located within the fishing line play-out side with respect to the axis X of the rotor 39.

Also, reference numeral 85 designates a cover for covering the whole of the storage portion 79. The cover 85 is screwed to a support portion 87 provided in the peripheral wall 81. The cover 85 and the storage portion 79 of the support arm 43 cooperate in forming a mounting portion 88 on the leading end side of the support arm 43 for mounting the bail support member 47. And, on the leading end side of the support arm 43, there is provided a cylindrical-shaped support shaft 89 on which the base portion 47a of the bail support member 47 is journaled. As shown in FIG. 5, the base portion 47a of the bail support member 47 is formed in a flat shape having a small thickness which not only permits the base portion 47a to be inserted through the cut-out portion 83 but also prevents it from projecting outwardly from the support arm in the width direction. The base portion 47a of the bail support member 47 is also covered with the cover 85.

In order to prevent the entanglement of fishing line during the fishing operation, similarly to the bail support member 45, the bail support member 47 is formed in such a manner that it has a smooth outer shape over an area ranging from the leading end portion 47b thereof to the base portion 47a thereof.

In this manner, according to the present embodiment, similarly to the bail support member 45, the base portion 47a of the bail support member 47 is also formed in a flat and thin shape and is journaled on the support shaft 89, thereby being able to reduce the thickness of the support arm 43 itself. Also, the base portion 47a of the bail support member 47 is covered with the cover 85, thereby being able to prevent the fishing line from becoming entangled.

Figure 6:
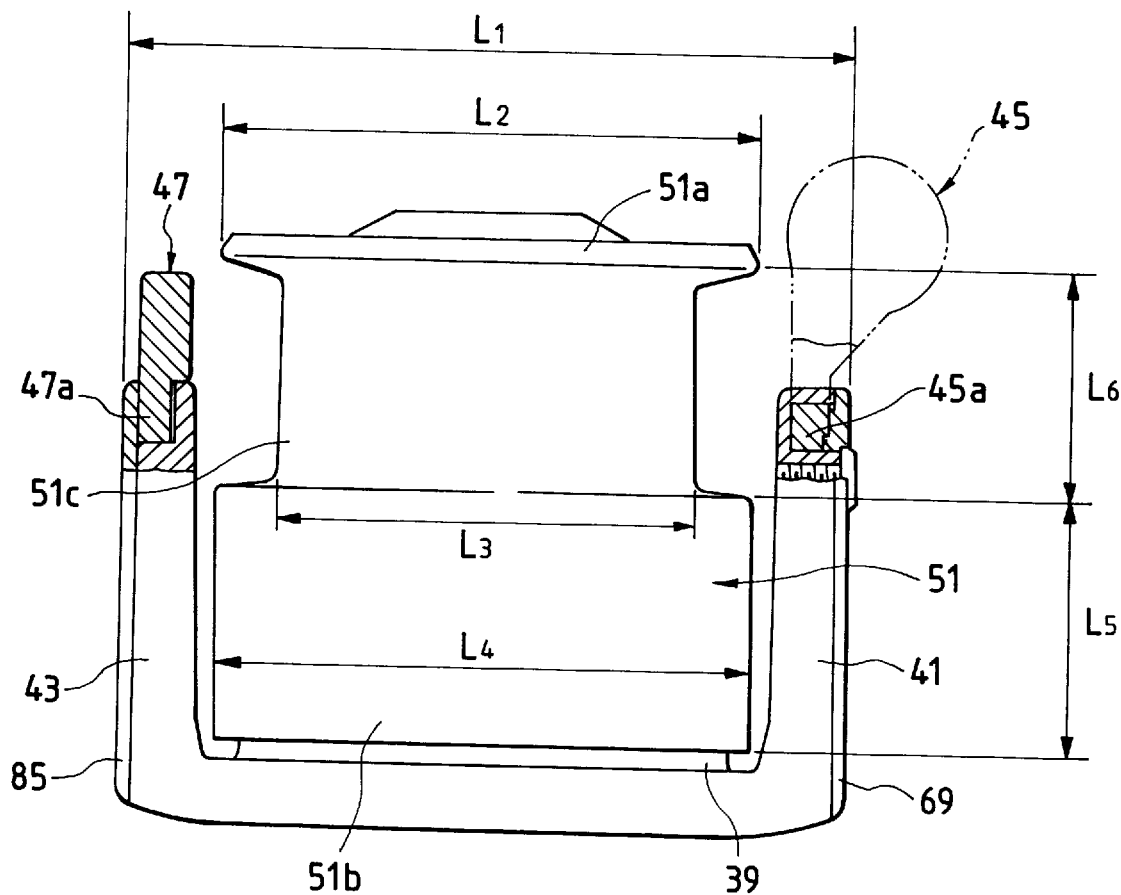
FIG. 6 is a side view of the rotor.

As shown in FIG. 6, according to the present embodiment, in addition to the fact that the support arms 41 and 43 themselves are reduced in thickness in this manner, the outside width dimension $L_1$ defined by the present support arms 41 and 43 is set equal to that of support arms employed in a conventional spinning reel, and the ratio of the outside diameter dimension $L_2$ of the front side flange portion 51a of the spool 51 is set as 70% with respect to the present outside width dimension $L_1$. This allows the diameter of the spool 51 over the conventional spinning reel without increasing the entire size of the fishing reel. It is preferable that the ratio $L_2/L_1$ is set in the range of 60% to 80%.

Conventionally, in the spinning reel of this type, the ratio of the outside diameter dimension of the front side flange portion of the spool with respect to the outside width dimension of the support arms is about 50%.

However, as described before, in the spinning reel of a type that it has a big size due to the increased thicknesses of the support arms, if the diameter of the spool is increased, then the rotor is increased in size to thereby increase the size of the reel main body, with the result that the whole spinning reel is increased in size and weight, which adversely affects on the fishing operation of the spinning reel.

In view of this, according to the present embodiment, the base portions 45a and 47a of the bail support members 45 and 47 are respectively formed in a flat and thin shape without increasing the outside width dimension $L_1$ of the support arms 41 and 43 of the rotor 39, and the thus formed base portions 45a and 47a are then journaled on the support shafts 71 and 89, respectively provided within the mounting portions 70 and 88, whereby the support arms 41 and 43 themselves can be reduced in thickness so that the diameter of the spool 51 can be increased. Because the outside width dimension, i.e. the diameter, $L_2$ of the front side flange portion 51a of the spool 51 is increased, if it is not necessary to increase the amount of the fishing line to be wound around the fishing line winding barrel portion 51c, then the diameter $L_3$ of the fishing line winding barrel portion 51c can be increased, to provide a spool having a shallow groove design. The shallow groove design has an advantage in that the flying distance of the terminal device (that is, the casting ability) can be increased. Further, is the increased diameter of the spool 51 can provide an advantage in that the permanent deformation hardly occurs on the fishing line. Alternatively, the axial length $L_5$ of the rear side flange portion 51b may be set larger than the axial length $L_6$ of the fishing line winding barrel portion 51c. in addition, according to the increased diameter $L_2$ of the front side flange portion 51a of the spool 51, the diameter $L_4$ of the rear side flange portion 51b in the present embodiment is set equal to the diameter $L_2$. As noted above, because of the support arm n 41 and 43 and the bail support members 45 and 47 which occupy very small space in the diametrical direction, great freedom for designing the spool can be obtained without increasing the size of the spinning reel.

If the diameter $L_2$ of the front side flange portion 51a of the spool 51 is set in the range of 30 mm to 70 mm, the diameter $L_3$ of the fishing line winding barrel portion 51c relative to the diameter $L_2$ of the front side flange portion 51a is Bet in the range of 0.7 to 0.9 and the diameter $L_4$ of the rear side flange portion 51b relative to the diameter $L_2$ of the front side flange portion 51a is set in the range of 0.95 to 1.05, then the following advantages can be obtained. That is, the permanent deformation hardly remains on the fishing line, the friction caused by the front side flange portion 51a onto the fishing line being played out from the spool 51 is properly reduced to increase the flying distance, the speed of winding-up or take-up the fishing line onto the spool 51 can be increased, and the necessary, proper amount of the fishing line to be wound onto the spool 51 can be obtained. Therefore, the winding ability and the casting ability can be enhanced by the combination of these features. In addition, the winding ability and the casting ability can be further enhanced if the diameter $L_2$ of the front side flange portion 51a is set in the range of 40 mm to 60 mm, the diameter $L_3$ of the fishing line winding barrel portion 51c is set in the range of 30 mm to 50 mm, the diameter of the rear side flange portion 51b is set in the range of 40 mm to 60 mm, the diameter $L_3$ of the fishing line winding barrel portion 51c relative to the diameter $L_2$ of the front side flange portion 51a is set in the range of 0.7 to 0.9 and the diameter $L_4$ of the rear side flange portion 51b relative to the diameter $L_2$ of the front side flange portion 51a is set in the range of 0.95 to 1.05.

As shown in FIGS. 4 and 5, the return device 59 Includes a substantially L-shaped kick member 93, which can be rotatably mounted on a support shaft 91 provided on and projecting from the inner surface 79a of the storage portion 79, and an operation body 99, which is connected through an elongated hole 95 to the kick member 93 by an engaging pin 97. When the bail support member 47 is situated at the fishing line take-up position, an engaging portion 103, which is formed in the kick member in such a manner that it extends from the rear end side of the kick member 93, is pressed against the inner periphery of the peripheral wall 81 due to the spring force of a torsion spring 101 wound around the support shaft 91.

Also, in the base portion 47a of the bail support member 47, there is formed a stepped portion 105 which, when the bail support members 45 and 47 are reversed from their respective fishing line take-up positions to their respective fishing line play-out positions, butts against the leading end of the operation body 99 to thereby press the operation body downward. That is, it the bail support members 45 and 47 are reversed to their respective fishing line play-out positions and the operation body 99 is moved downward in this manner, then the kick member 93 is rotated about the support shaft 91 against the spring force of the torsion spring 101, so that the engaging portion 103 of the kick member 93 is projects backwardly of the reel main body 37 from an opening 107 formed in the peripheral wall 81.

The bail support members 45 and 47 are positioned and held selectively at their respective fishing line play-out or take-up positions by the previously-mentioned urging device 57. As shown in FIG. 1, a returning projection 111 is provided on the leg portion of the reel main body 37 in such a manner that it projects forwardly of the leg portion 109. When the bail support members 45 and 47 are situated at their respective fishing line play-out positions, for example, if an angler operates the handle to thereby rotate the rotor 39 in the fishing line take-up direction, then the engaging portion 103 abuts against the returning projection 111 so as to rotate the kick member 93 to a position shown by a solid line in FIG. 4 due to the spring force of the torsion spring 101. As a result of this, the operation body 99 is moved upward while being pressed against the stepped portion 105 of the bail support member 47, to thereby rotate the bail support members 45 and 47 toward the fishing line take-up position side thereof.

When the bail support members 45 and 47 are reversed in this manner, then the operation rod 75 of the urging device 57. FIGS. 2 and 3 is pressed downward to thereby compress the coil spring 73 and. If the operation rod 75 is moved on and exceeds the dead point of the coil spring 73, then the bail support members 45 and 47 can be held at their respective fishing line take-up positions due to the spring force of the coil spring 73.

In FIG. 4, reference character 113 designates a guide portion which is extended from the peripheral wall 81 for guiding the operation body 99.

Since the spinning reel 61 according to the present embodiment is structured in the above-mentioned manner, when playing out the fishing line, if the bail support members 45 and 47 situated at their respective fishing line take-up positions are operated or reversed by hand through the bail 49 toward their respective fishing line play-out positions, then the operation rod 75 of the urging device 57 is pressed downward to thereby compress the coil spring 73. If the present operation rod 75 exceeds the dead point of the coil spring 73, then the operation rod 75, as shown by a two-dot chained line in FIG. 2, can hold the bail support members 45 and 47 at their respective fishing line play-out positions due to the spring force of the coil spring 73.

Also, with the manual reversal operation of the two bail support members 45 and 47 toward their respective fishing line play-out positions, the stepped portion 105 formed in the base portion 47a of the bail support member 47 rotates the kick member 93 through the operation body 99 against the spring force of the torsion spring 101. Due to this, as shown by a two-dot chained line in FIG. 4, the engaging portion 103 is projected backwardly of the reel main body 37 from the opening 107 formed in the peripheral wall 81.

On the other hand, if the two bail support members 45 and 47 held at their respective fishing line play-out positions are reversed to their respective fishing line take-up positions by operating or returning them manually, then the pressed condition of the operation body 99 by the stepped portion 105 is removed and thus the kick member 93 is rotated to a position shown by a solid line in FIG. 4 due to the spring force of the torsion spring 101 and, at the same time, the operation rod 75 of the urging device 57 is pressed downward. That is, while compressing the coil spring 73, the operation rod 75 exceeds the dead point of the coil spring 73, so that the operation rod 75 can hold the two bail support members 45 and 47 at their respective fishing line take-up positions as shown by a solid line in FIG. 2.

Also, when the two bail support members 45 and 47 are held at their respective fishing line play-out positions, if the angler rotates the rotor 39 in the fishing line take-up direction by means of the handle operation, then, as described above, the engaging portion 103 abuts against the returning projection 111. As a result and thus the kick member 93 is rotated to a position shown by a solid line in FIG. 4 due to the spring force of the torsion spring 101. As a result of this, while being pressed against the stepped portion 105 formed in the base portion 47a of the bail support member 47, the operation body 99 is moved upward to thereby reverse the bail support member 47 to its fishing line take-up position side. And, when the bail support member 47 is rotated in this manner, then the operation rod 75 of the urging device 57 similarly exceeds the dead point of the coil spring 73, so that the operation rod 75 can hold the two bail support members 45 and 47 at their respective fishing line take-up positions due to the spring force of the coil spring 73.

As described above, according to the present embodiment, the base portions 45a and 47a of the bail support members 45 and 47 are respectively formed in a thin and flat shape which prevents the base portions 45a and 47a from projecting outwardly of the width of the support arms 41 and 43 and the thus formed base portions 45a and 47a are then journaled on the support shafts 71 and 89 respectively, thereby being able to reduce the thicknesses of the support arms 41 and 43 themselves. Also, the outside width dimension $L_1$ of the present support arms 41 and 43 is set equal to that of the support arms provided in the conventional spinning reel. The ratio of the outside diameter dimension $L_2$ of the front side flange portion 51a of the spool 51 with respect to the present outside width dimension $L_1$ is set as 70% to thereby increase the diameter of the spool 51. The base portions 45a and 47a are covered with the covers 69 and 85 respectively. Thanks to this, the fishing line can be taken up around the spool 51 at a high winding speed without becoming entangled around the bail support members 45 and 47.

That is, according to the present embodiment, the diameter of the spool 51 can be increased without increasing the sizes of the rotor 39 and reel main body 37. Also, the projecting elements are removed from the surfaces of the support arms 41 and 43 to thereby prevent the fishing line from becoming twined around the support arms 41 and 43 in the fishing operation of the spinning reel. As a result, so that the diameter of the spool 51 can be increased without worsening the efficiency of the fishing operation of the spinning reel.

Therefore, the increased diameter of the spool 51 allows the fishing line winding speed to be increased, makes it difficult for the fishing line to be deformed strangely, thereby facilitating the thumbing operation of the spinning reel, and permits a brake plate to be increased in size to thereby enhance the drag force of the drag device. That is, due to the increased diameter of the spool 51, the practical use of the spinning reel can be improved further.

Moreover, according to the present embodiment, the two bail support members 45 and 47 are so formed as to have a smooth outer shape, and the base portions 45a and 47a thereof are formed in such flat and thin shapes that prevent the base portions 45a and 47a from protecting out from the storage portions 63 and 79. The thus formed base portions 45a and 47a are slidably mounted on the inner surfaces 63a and 79a of the storage portions 63 and 79, the base portions 45a and 47a are respectively covered with the covers 69 and 85, and the front walls 65a and 61a of the peripheral walls 65 and 81 are respectively extended up to the respective leading end portions of the support arms 41 and 43. Due to this, the covers 69, 85, front walls 65a, 81a, and bail support members 45, 47 themselves operate positively to prevent the fishing line from becoming entangled during the fishing operation. Accordingly, the fishing line can be taken up securely around the spool 51 without becoming entangled around the bail support members 45, 47, the leading end portions of the support arms 41, 43, or the like.

As described above, according to the present embodiment, since the fishing line can be securely taken up around the spool 51 without becoming entangled around the bail support members 45, 47, the leading end portions of the support arms 41, 43, or the like. This eliminates the possibility that the fishing line can be entangled during the fishing operation, which improves the efficiency of the fishing operation of the present spinning reel greatly over the conventional spinning reels.

Figure 7:
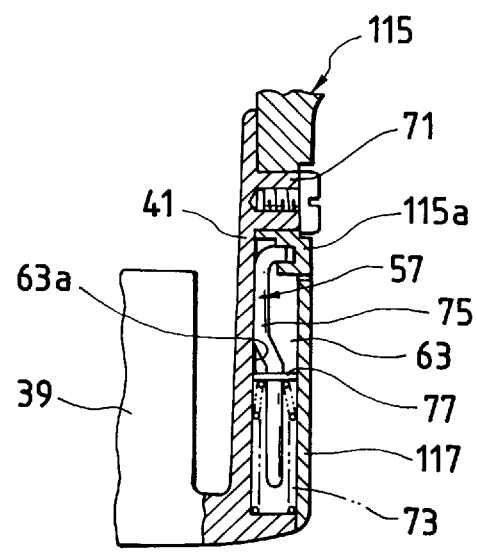
FIG. 7 is a section view of a support arm employed in a second embodiment of a spinning reel according to the invention.

Now, FIG. 7 shows a section view of a support arm employed in a second embodiment of a spinning reel according to the invention. In the above-mentioned first embodiment, as shown in FIG. 3, on the leading end side of the support arm 41, the mounting portion 70 for mounting the bail support member 45 is formed by means of cooperation between the storage portion 63 provided in the present support arm 41 and the cover 69 for covering the storage portion 63, and the base portion 45a of the bail support member 45 is covered with the cover 69. On the other hand, according to the present second embodiment, only the urging device 57 is covered with a cover 117. That is, the cover 117 is located to cover only the lower portion of the storage portion 63. In order to prevent the entanglement of the fishing line during the fishing operation, the base portion 115a of a bail support member 115 is so formed as to have a thickness which produces no level difference between the base portion 115a and the cover 117, the thus formed base portion 115a is journaled on the support shaft 71 provided on the leading end side of the support arm 41, and the bail support member 115 is mounted in such a manner that it can be reversed between its fishing line take-up and play-out positions.

Here, since the remaining portions of the structure of the present embodiment are similar to those of the previously described embodiment, the same parts are given the same designations and the description thereof is omitted here.

As mentioned above, according to the present embodiment as well, since the projecting elements are removed from the surface of the support arm 115, not only can the fishing line be prevented from being entangled during the fishing operation of the reel, but also the diameter of the spool 51 can be increased without increasing the sizes of the rotor 39 and reel main body 37. As a result of this, similarly to the previously described embodiment, the expected object of the present invention can be achieved.

Figure 8:
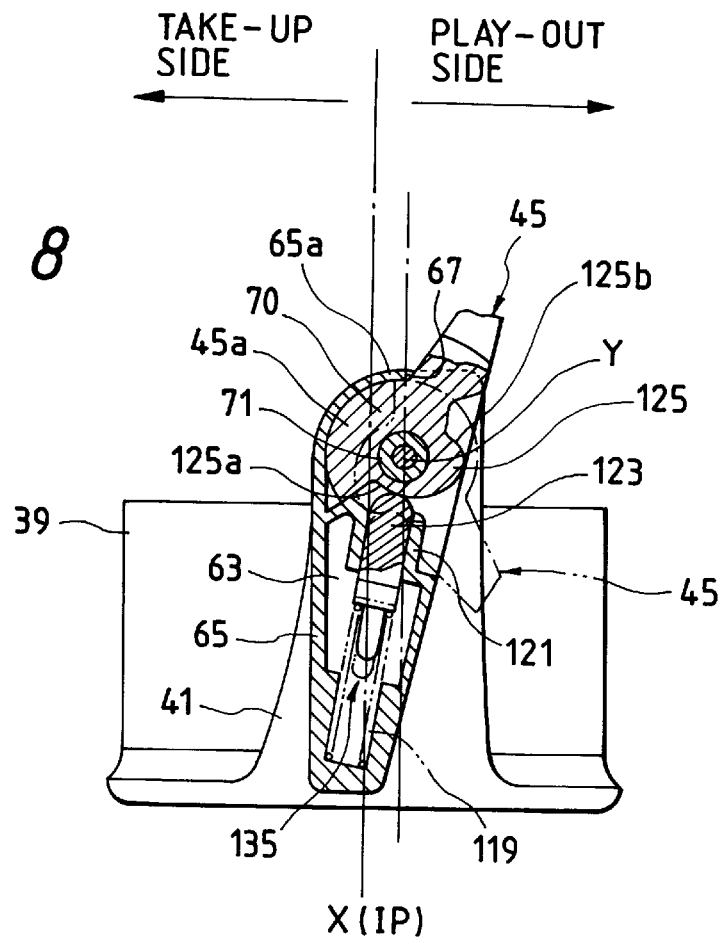
FIG. 8 is a side view, partly in section, of the main portions of a rotor, showing a mounting structure and an urging structure for a bail support member provided in a third embodiment of a spinning reel according to the invention.
Figure 9:
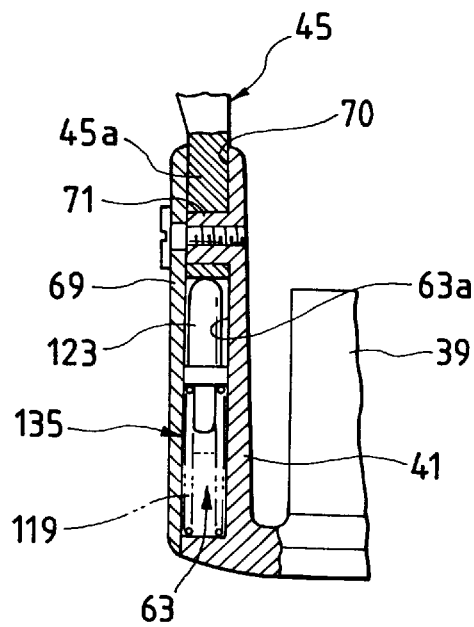
FIG. 9 is a section view of a support arm provided in the rotor shown in FIG. 8.

Now, FIGS. 8 and 9 show the details of an urging device 135 of a bail support member employed in a third embodiment of a spinning reel according to the invention. Here, since the remaining portions of the structure of the present embodiment are similar to those of the embodiment previously described in connection with FIGS. 1 to 6, the same parts are given the same designations and the description thereof is omitted here.

In FIGS. 8 and 9, reference character 119 designates a coil spring which is provided in such a manner that it extends from the center of the base end portion of the storage portion 63 formed in the support arm 41 toward the leading end thereof and, on the leading end of the coil spring 119, there is mounted a substantially cannonball-shaped stopper 123 which is guided by a guide portion 121 extended from the peripheral wall 65. The stopper 123 is always pressed against the outer periphery of the base portion 45a of the bail support member 45 due to the spring force of the coil spring 119.

Also, a cam portion 125 is provided on and projects from the outer periphery of the base portion 45a of the bail support member 45. In particular, when the two bail support members 45 and 47 are held at their respective fishing line take-up positions shown by a solid line, the stopper 123 is pressed against one arc portion 125a of the cam portion 125. On the other hand, when the bail support members 45 and 47 are situated at their respective fishing line play-out positions shown by a two-dot chained line, the stopper 123 is pressed against the other arc portion 125b of the cam portion 125. That is, the stopper 123 is able to switchingly urge and hold the two bail support members 45 and 47 at their fishing line take-up or play-out positions.

Figure 10:
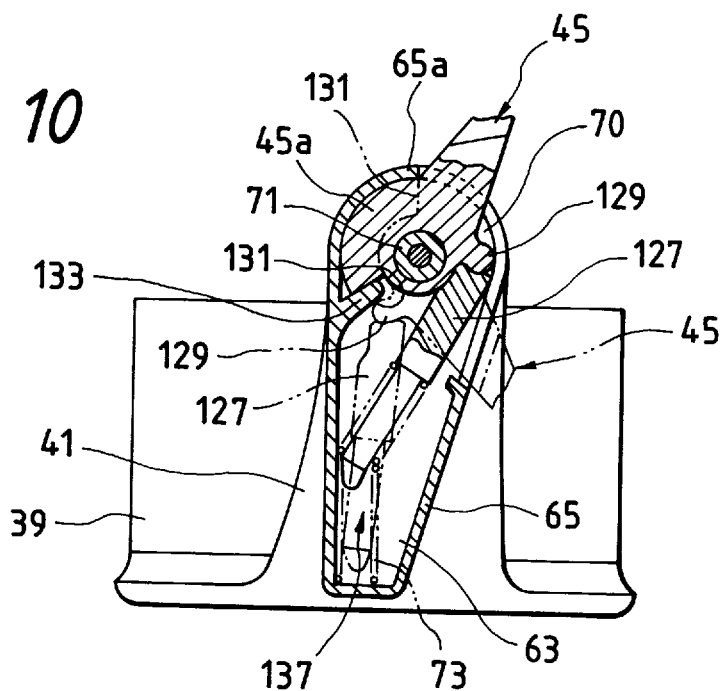
FIG. 10 is a side view, partly in section, of the main portions of a rotor, showing a mounting structure and an urging structure for a bail support member provided in a fourth embodiment of a spinning reel according to the invention.
Figure 11:
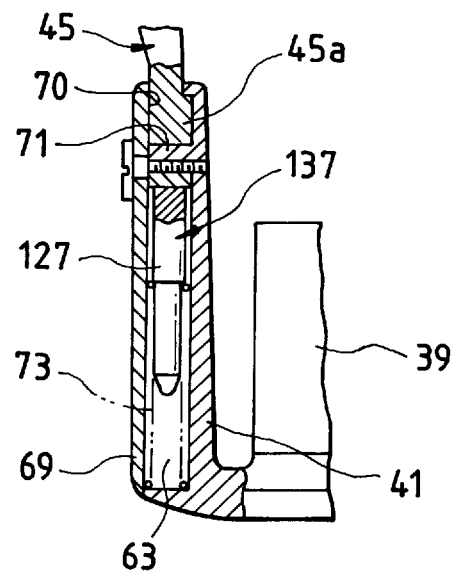
FIG. 11 is a section view of a support arm provided in the rotor shown in FIG. 10.

Now, FIGS. 10 and 11 respectively show the details of an urging device 137 of a bail support member employed in a fourth embodiment of a spinning reel according to the invention. In FIGS. 10 and 11, reference character 127 designates a stopper which is mounted on the leading end of a coil spring 73. The coil spring 73 is provided in the base end portion of a storage portion 63 in such a manner that it extends toward the leading end of the storage portion 63 and is offset to one side. The stopper 127 is always pressed against the base portion 45a of a bail support member 45 due to the spring force of the spring coil 73.

On the outer periphery of the base portion 45a of the bail support member 45, there is provided an engaging projection 129 with which the stopper 127 can be engaged, and there is formed a stepped portion 131 substantially on the opposite side to the engaging projection 129 with respect to a support shaft 71.

Also, on the peripheral wall 65, there is provided a stopper piece member 133 projecting toward the support shaft 71 and, when the bail support member 45 is situated at its fishing line take-up position shown by a solid line, the stopper piece member 133 is pressed against the stepped portion 131 of the base portion 45a urged counterclockwise by the stopper 127 in engagement with the engaging projection 129, so that the bail support member 45 can be positioned and held at the fishing line take-up position.

On the other hand, if the bail support member 45 is reversed to its fishing line play-out position shown by a two-dot chained line, then the stopper 127 is pressed against the stopper piece member 133 due to the action of the coil spring 73, so that the bail support member 45 can be positioned and held at the fishing line play-out position.

Here, the remaining portions of the structure of the present embodiment are similar to those of the embodiment shown in FIG. 1 and, therefore, the same parts are given the same designations and the description thereof is omitted here.

Accordingly the base portions 45a and 47a of the bail support members 45 and 47 are respectively formed in a thin and flat shape having a width which prevents the respective base portions 45 and 47 from projecting outwardly of the support arms 41 and 43. Also the outside width dimension of the support arms 41 and 43, and the thus formed base portions 45a and 47a are respectively journaled on the support shafts 71 and 89 of the mounting portions 70 and 88, Thus, according to these embodiments as well, it is possible to prevent the fishing line from turning in the fishing operation of the reel. Also, the support arms 41 and 43 themselves can be reduced in thickness to thereby be able to increase the diameter of the spool 51. That is, similarly to the embodiment shown in FIG. 1, according to the present embodiments as well, the expected object of the invention can be attained.

Now, FIGS. 12 to 14 and FIGS. 15 to 17 respectively show the details of urging devices of bail support members respectively employed in fifth and sixth embodiments of a spinning reel according to the invention.

In these respective embodiments as well, the other remaining portions of the present embodiments than the urging devices thereof are similar to those of the first embodiment previously described in connection with FIG. 1 and, therefore, the same parts are given the same designations and the description thereof is omitted here.

Figure 12:
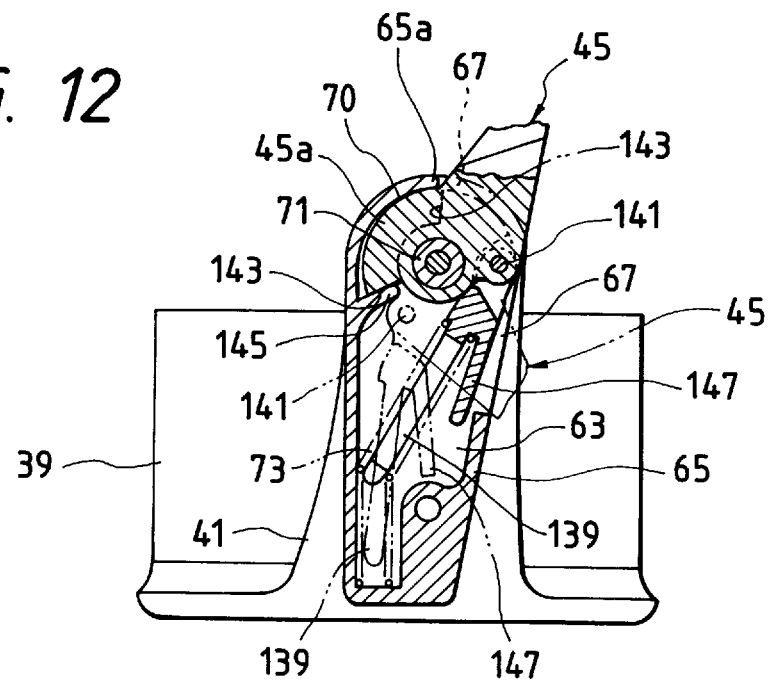
FIG. 12 is a side view, partly in section, of the main portions of a rotor, showing a mounting structure and an urging structure for a bail support member provided in a fifth embodiment of a spinning reel according to the invention.
Figure 13:
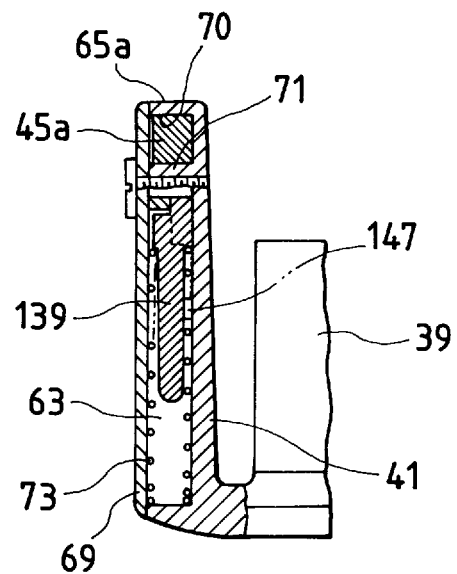
FIG. 13 is a section view of a support arm provided in the rotor shown in FIG. 12.

In particular, in FIGS. 12 and 13, reference character 139 designates a stopper including a leading end which is rotatably connected with the base portion 45a of the bail support member 45 through an engaging pin 141. Also, the rear portion of the stopper 139 is mounted on the leading end of a coil spring 73 which is provided in the base end portion of the storage portion 63 in such a manner that it extends toward the leading end of the storage portion 63 and is offset to one side thereof, and the stopper 139 always urges the bail support member 45 due to the spring force of the coil spring 73.

On the outer periphery of the base portion 45a of the bail support member 45, there is formed a stepped portion 143 almost on the opposite side to the connecting portion (i.e. the engaging pin 141) of the bail support member 45 with the stopper 139 with respect to a support shaft 71. Also, on the peripheral wall 65, there is provided a stopper piece member 145 which projects toward the support shaft 71. In particular, when the bail support member 45 is situated at a fishing line take-up position shown by a solid line, the stopper piece member 145 is pressed against the stepped portion 143 of the base portion 45a of the bail support member 45 urged counterclockwise by the stopper 139, so that the bail support member 45 can be positioned and held. On the other hand, if the bail support member 45 is reversed to a fishing line play-out position shown by a two-dot chained line, then the stopper 139 presses the connecting portion thereof with the base portion 45a against the stopper piece member 145 due to the action of the coil spring 73, so that the bail support member 45 can be positioned and held at the fishing line play-out position.

Also, in addition to the above-mentioned structure, the present embodiment is characterized in that there is provided in the stopper 139 a closing member 147 which, when the two bail support members 45 and 47 are held at their respective fishing line take-up positions, closes a cut-out portion 67 formed in the peripheral wall 65 of the bail support member 45.

Figure 14:
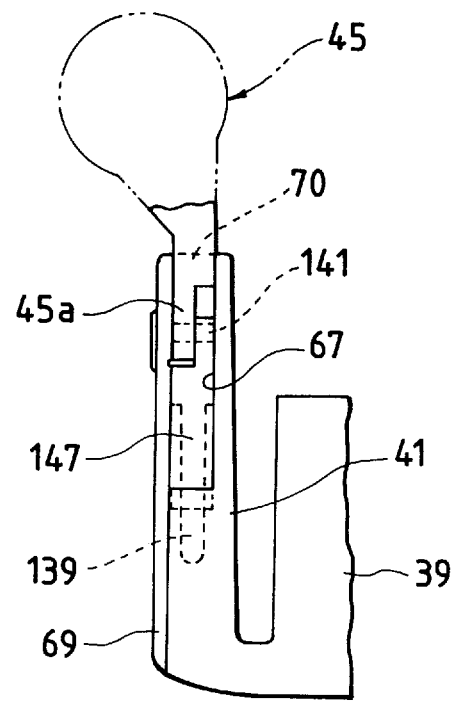
FIG. 14 is a side view of the support arm provided in the rotor shown in FIG. 12.

The closing member 147 is a flat plate member which is formed integrally with the stopper 139 and, as shown in FIGS. 12 to 14, when the bail support member 45 is held at the fishing line take-up position, the closing member 147 closes the cut-out portion 67 formed in the peripheral wall 65 to thereby be able to prevent foreign material from entering through the cut-out portion 67. On the other hand, as shown by a two-dot chained line in FIG. 12, when the bail support member 45 is reversed to the fishing line play-out position, then the closing member 147 opens the cut-out portion 67.

As described above, according to the present embodiment as well, similarly to the previously described respective embodiments, the support arms 41 and 43 themselves are reduced in thickness to thereby be able to increase the diameter of the spool 51, and the entanglement of the fishing line is prevented to thereby be able to enhance the efficiency of the fishing operation of the spinning reel. In addition to this, according to the present embodiment, since it is possible to prevent foreign material from entering into the storage portion 63 of the support arm 41, the present spinning reel can be used reliably even in a severe fishing spot.

Figure 15:
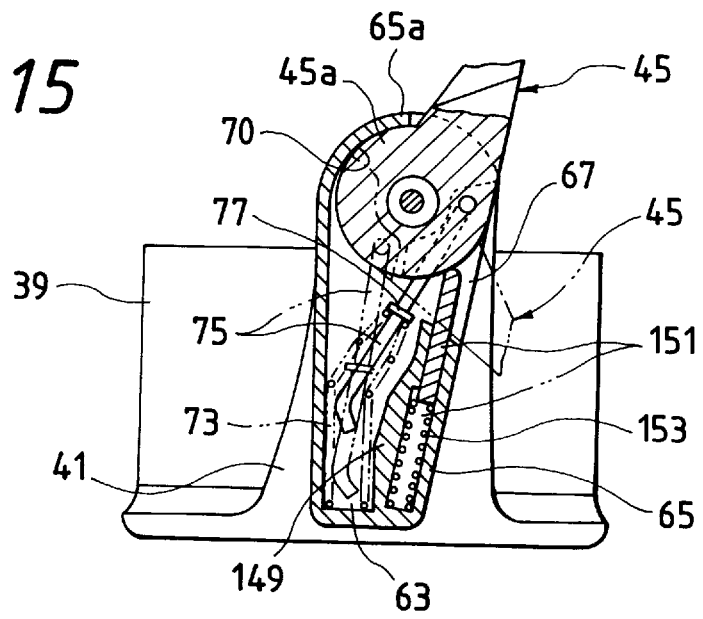
FIG. 15 is a side view, partly in section, of the main portions of a rotor, showing a mounting structure and an urging structure for a bail support member provided in a sixth embodiment of a spinning reel according to the invention.
Figure 16:
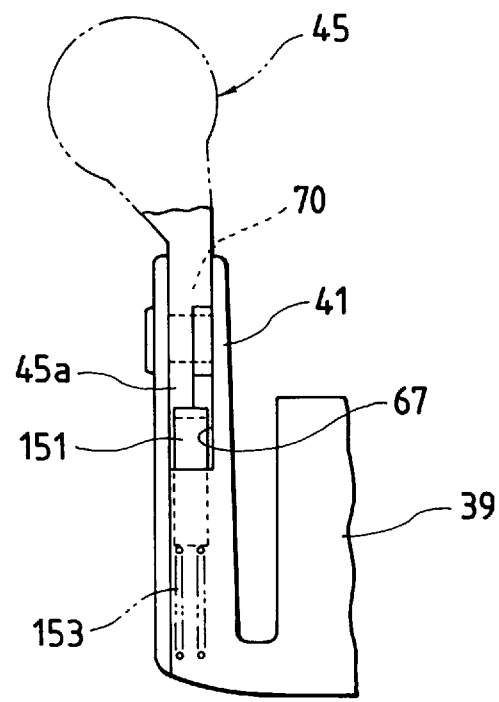
FIG. 16 is a side view of a support arm provided in the rotor shown in FIG. 15.
Figure 17:
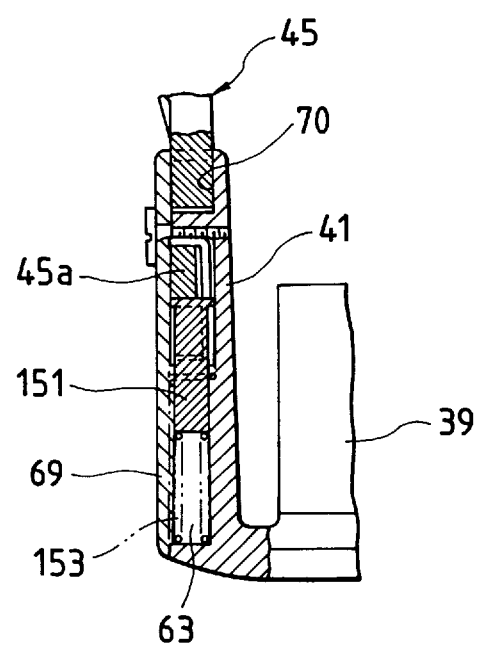
FIG. 17 is a section view of the support arm provided in the rotor shown in FIG. 15.

Referring now to an embodiment shown in FIGS. 15 to 17, instead of the structure of the above-mentioned embodiment in which the closing member 147 is formed integral with the stopper 139, the embodiment shown in FIG. 1 is modified in such a manner that a closing member is provided as a separate member.

That is, in these figures, reference character 149 designates a guide wall which is provided in a storage portion 63 in such a manner that it extends from the base end portion of the support arm 41 toward the leading end thereof, and 151 a flat-plate-like closing member which is inserted between the present guide wall 149 and peripheral wall 65. Also, a coil spring 153 is mounted on the lower portion of the present closing member 151 so that the closing member 151 is always pressed against the bail support member 45 due to the spring force of the present coil spring 153.

When the bail support member 45 is held at a fishing line take-up position shown by a solid line, the closing member 151 is pressed against the outer periphery of the base portion 45a of the bail support member 45 due to the spring force of the extended coil spring 153 to thereby close a cut-out portion 67 formed in the peripheral wall 65. On the other hand, if the bail support member 45 is reversed from the fishing line take-up position to the fishing line play-out position, then the closing member 151 is pressed downward by the bail support member 45 against the spring force of the coil spring 153, as shown by a two-dot chained line.

Here, in order to prevent the bail support member 45 at the fishing line play-out position from being reversed in the fishing line take-up direction by the closing member 151, the spring force of the coil spring 153 is set weaker than that of the coil spring 73.

As described above, according to the present embodiment as well, similarly to the embodiment shown in FIG. 12, removal of the projecting elements from the surface of the support arm 41 not only can prevent the entanglement of the fishing line to thereby improve the efficiency of the fishing operation of the present spinning reel, but also can reduce the thickness of the support arm 41 itself to thereby increase the diameter of the spool 51. Also, the present embodiment can prevent foreign material from entering into the support arm 41. That is, the spinning reel according to the present embodiment can be used reliably even in a severe fishing spot.

Figure 18:
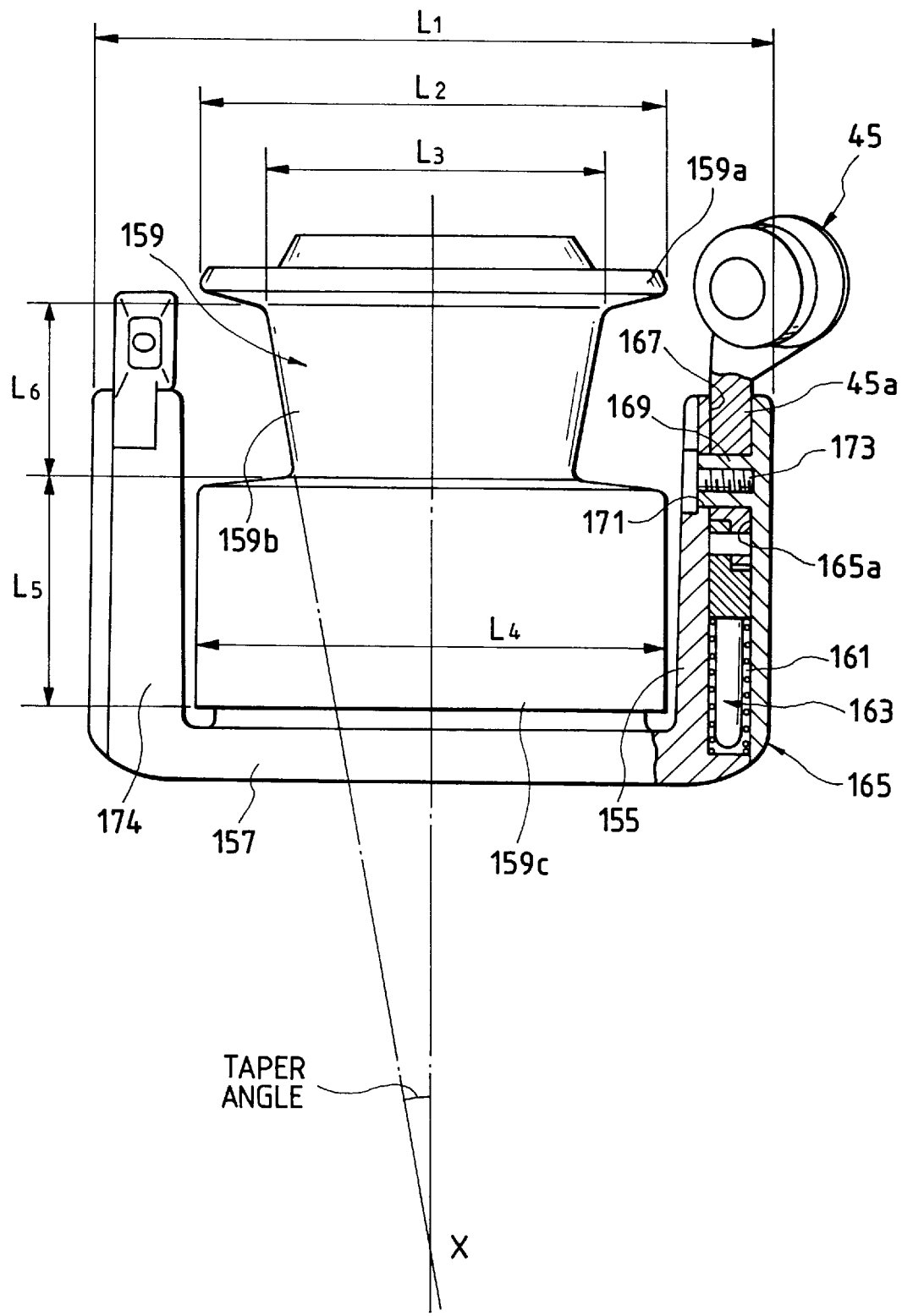
FIG. 18 is a side view, partly in section, of the main portions of a rotor employed in a seventh embodiment of a spinning reel according to the invention.

Now, FIG. 18 shows a side view, partly in section, of the main portions of a rotor which is mounted in a spinning reel according to a seventh embodiment of the invention. In the present embodiment as well, the same parts as in the above-mentioned respective embodiments are given the same designations and thus the description thereof is omitted here.

In FIG. 18, reference character 155 designates a support arm provided in a rotor 157 and 159 stands for a spool. On the leading end portion of the support arm 155, there is mounted a bail support member 45 in such a manner that it can be reversed between its fishing line take-up and play-out positions. In particular, the bail support member 45 can be switchingly urged to and held at the fishing line take-up and play-out positions by an urging device 163 which is installed within a storage portion 161 of the support arm 155. By the way, the present urging device 163 is substantially the same in structure as the embodiment shown in FIG. 12 and thus the description thereof is omitted here.

The storage portion 161 is formed in such a manner that it is enclosed by the peripheral wall of the support arm 155 over an area ranging from the base end portion of the surface of the support arm 155 to the leading end portion thereof. Also, there is mounted a cover 165 which is used to cover the whole of the present storage portion 161. In the present embodiment as well, the present cover 165 and the storage portion 161 of the support arm 155 cooperate in forming a mounting portion 167 on the leading end side of the support arm 155 for mounting the bail support member 45.

As shown in FIG. 18, on the inner surface 165a of the leading end portion of the cover 165, there is provided a cylindrical support shaft 169. In particular, the support shaft 169 is engaged with an engaging hole 171 formed in the support arm 155 and a screw 173 is screwed into the support shaft 169, whereby the cover 165 is threadedly engaged with the support arm 155. That is, according to the present embodiment, the base portion 45a of the bail support member 45 is journaled on the present support shaft 169 in such a manner that the bail support member 45 can be reversed between the fishing line take-up and play-out positions, thereby removing the projecting elements from the surface of the support arm 155 to be able to prevent the entanglement of the fishing line.

Also, in the present embodiment as well, similarly to the embodiment shown in FIG. 1, the outside width dimension $L_1$ of the support arms 155 and 174 respectively provided in the rotor 157 is set equal to that of the support arms provided in the conventional spinning reel, and the ratio of the outside diameter dimension $L_2$ of the front side flange portion 159a of the spool 159 with respect to the present outside width dimension $L_1$ is set 70%, thereby being able to increase the diameter of the spool 159. Further, according to the present embodiment, the fishing line winding barrel portion 159b of the spool 159 is formed in a taper shape (an inverted taper shape) which increases sequentially in diameter forwardly in the spool shaft (X) direction. The ratio of the outside diameter dimension $L_3$ of the fishing line winding barrel portion 159b with respect to the outside diameter dimension $L_2$ of the front side flange portion 159a ($L_3/L_2$) is set in the range of 0.7 to 0.9.

In this manner, according to the present embodiment as well, not only the entanglement of the fishing line is prevented to thereby be able to enhance the efficiency of the fishing operation of the spinning reel, but also the thickness of the support arm 155 itself is reduced to thereby be able to increase the diameter of the spool 159. In addition to these effects, according to the present embodiment, since the spool 159 is so formed to have an inverted taper shape, even if the fishing line is fully wound around the spool 159 up to the outside diameter dimension $L_2$ of the front side flange portion 159a, there is eliminated the possibility that the fishing line can collapse when it is played out, thereby being able to secure a sufficient amount of winding of the fishing line.

In the spinning reel according to the seventh embodiment of the present invention, the fishing line winding barrel portion 159b is tapered at an angle of 0.5° to 50° with respect to the common axis X of the rotor 157 and the spool 159 so that a diameter of the fishing line winding barrel portion 159b is gradually decreased from the front side flange portion 159a to the rear side flange portion 159c, and an axial length $L_5$ of the rear side flange portion 159c along the axis X is larger than an axial length $L_6$ of the fishing line winding barrel portion 159b. According to the combination of these designs for the spool 159, a proper friction is applied onto a fishing line during when the fishing line is released (played out) from the spool 159 and thus it is possible to prevent the backlash of the fishing line and the looseness of the fishing line. Because of the above-noted advantage, it is possible to fully wind the fishing line onto the fishing line barrel portion 159b up to the outer periphery of the front side flange portion 159a, to thereby increase the flying or casting distance of the fishing hooks.

Further, in the spinning reel according to the seventh embodiment of the present invention, a diameter $L_4$ of the rear side flange portion 159c relative to a diameter $L_2$ of the front side flange portion 159a is set at 0.95 to 1.05. Accordingly, a proper friction is applied onto a fishing line during the time when the fishing line is released (played out) from the spool and thus it is possible to prevent the backlash of the fishing line and the looseness of the fishing line. Because of the above-noted advantage, it is possible to fully wind the fishing line onto the fishing line barrel portion up to the outer periphery of the front side flange portion, to thereby increase the flying or casting distance of the fishing hooks while increasing the amount of the fishing line to be wound onto the spool 159.

Figure 19:
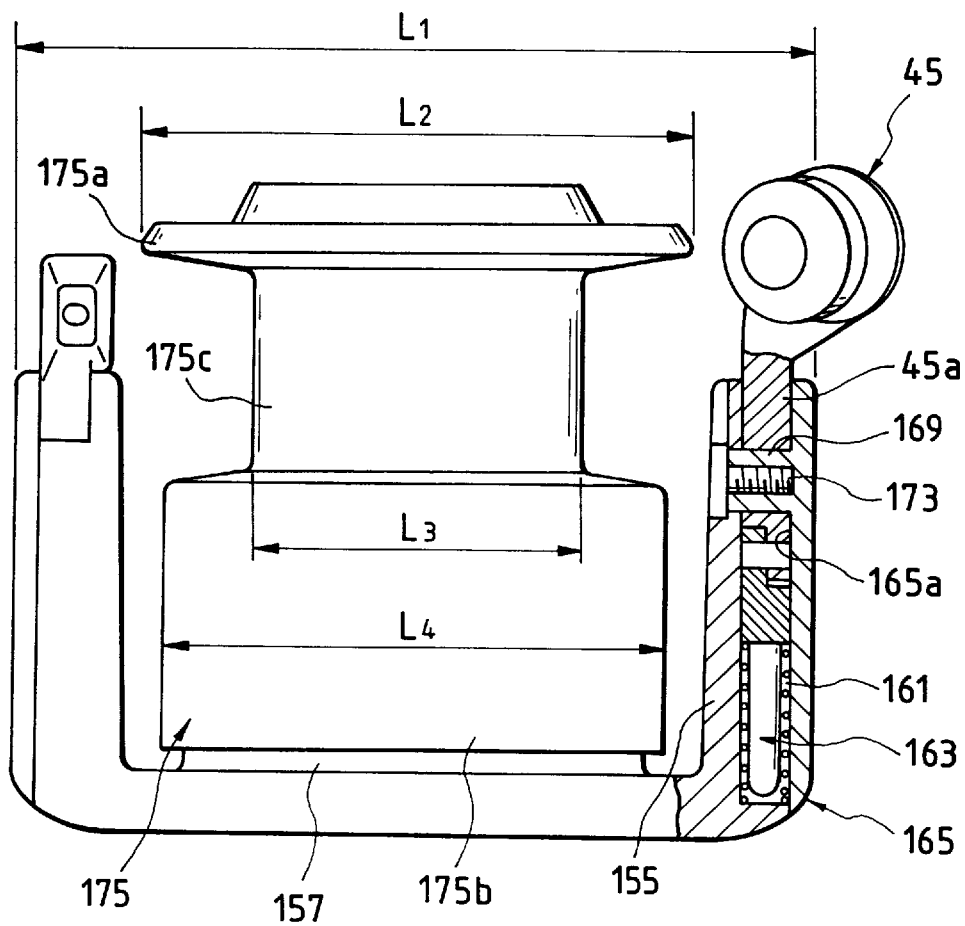
FIG. 19 is a side view, partly in section, of the main portions of a rotor employed in an eighth embodiment of a spinning reel according to the invention.

Now, FIG. 19 shows a side view, partly in section, of the main portions of an eighth embodiment of a spinning reel according to the invention. According to the present embodiment, instead of the above-mentioned spool 159, the outside diameter dimension $L_2$ of the front side flange portion 175a of a spool 175 is set larger than the outside diameter dimension $L_4$ of the rear side flange portion (the skirt portion) 175b of the spool 175, the fishing line winding barrel portion 175c of the spool 175 is formed in a substantially straight shape, and the ratio of the outside diameter dimension $L_3$ of the fishing line winding barrel portion 175c with respect to the outside diameter dimension $L_2$ of the front side flange portion 175a ($L_3/L_2$) is set in the range of 0.7 to 0.9. However, the remaining portions of the structure of the present embodiment are similar to those of the embodiment shown in FIG. 18 and, therefore, the same parts are given the same designations and the description thereof is omitted here.

In this manner, according to the present embodiment as well, the entanglement of the fishing line is prevented to thereby enhance the efficiency of the fishing operation of the spinning reel as well as the thickness of the support arm 155 itself is reduced to thereby be able to increase the diameter of the spool 175. In addition to these effects, according to the present embodiment, even if the fishing line is wound around the fishing line winding barrel portion 175c by an amount almost equivalent to the outside diameter dimension $L_4$ of the rear side flange portion 175b, because the front side flange portion 175a of the spool 175 is larger in the outside diameter than the rear side flange portion 175b, the fishing operation can be carried out without collapsing the fishing line and the fishing line can be wound in a larger amount, thereby being able to prevent the fishing line from being strangely deformed or twisted as much as possible.

In the spinning reel according to the eighth embodiment of the present invention, a diameter $L_4$ of the rear side flange portion 175b relative to a diameter $L_2$ of the front side flange portion 175a is set at 0.95 to 1.05. Accordingly, a proper friction is applied onto a fishing line when the fishing line is released (played out) from the spool 175 and thus it is possible to prevent the backlash of the fishing line and the looseness of the fishing line. Because of the above-noted advantage, it is possible to fully wind the fishing line onto the fishing line barrel portion 175c up to the outer periphery of the front side flange portion 175a, to thereby increase the flying or casting distance of the fishing hooks.

Figure 20:
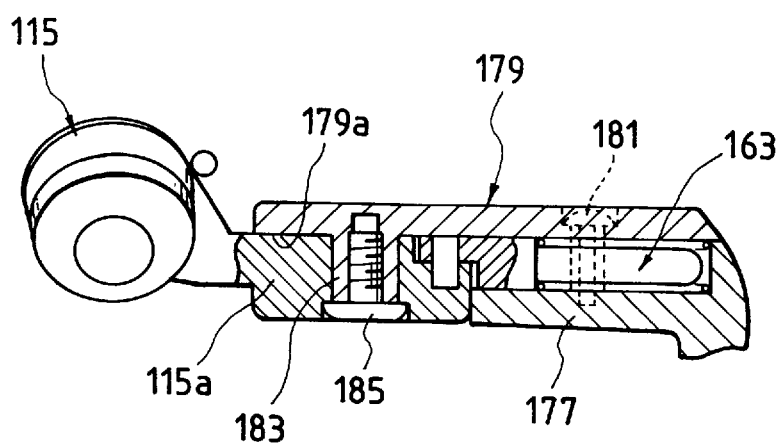
FIG. 20 is a section view of a support arm provided in a rotor employed in a ninth embodiment of a spinning reel according to the invention.

FIG. 20 shows a ninth embodiment of a spinning reel according to the invention. In FIG. 20, reference character 177 designates a support arm and 179 stands for a cover fixed to the surface of the present support arm 177 through a screw 181. According to the present embodiment, the support arm 177 is formed shorter in length than the cover 179 and, on the inner surface 179a of the leading end portion of the cover 179, there is provided a cylindrical support shaft 183 on which the base portion 115a of a bail support member 115 can be journaled. Also, in order to prevent a fishing line from being entangled during the fishing operation of the reel, the base portion 115a of the bail support member 115 is so formed as to have a thickness which produces no level difference between the support arm 177 and the base portion 115a when the present base portion 115a is journaled on the support shaft 183 through a screw 185.

The remaining portions of the structure of the present embodiment are similar to those of the embodiment shown in FIG. 18 and thus the description thereof is omitted here.

As described above, according to the present embodiment as well, it is possible to prevent the entanglement of the fishing line during the fishing operation of the reel and, at the same time, the diameter of the spool can be increased without increasing the sizes of the rotor and reel main body.

Figure 21:
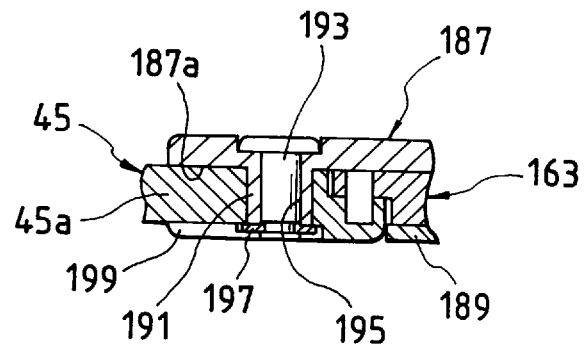
FIG. 21 is a partial section view of a support arm provided in a rotor employed in a tenth embodiment of a spinning reel according to the invention.

Now, FIG. 21 shows a tenth embodiment of a spinning reel according to the invention. Similarly to the embodiment shown in FIG. 20, in the present embodiment as well, a support arm 189 is formed shorter in length than a cover 187, on the inner surface 187a of the leading end portion of the cover 187, there is provided a cylindrical support shaft 191 on which the base portion 45a of the bail support member 45 can be journaled, and the present base portion 45a is so formed as to have a thickness which produces no level difference between the support arm 189 and the base portion 45a. In the present embodiment, in place of the above-mentioned screw 185, there is employed a pin 193 by which the bail support member 45 is mounted in such a manner that it can be reversed between its fishing line take-up and play-out positions.

That is, in the above-mentioned support shaft 191, there is formed a pin insertion hole 195. On the back surface of the base portion 45a, there is formed a cut-out portion 199 which is used to mount a retainer 197 into the insertion side leading end portion of the pin 193. In particular, if the pin 193 is inserted into the pin insertion hole 195 from the surface side of the cover 187 and the retainer 197 is mounted into the insertion side leading end portion of the pin 193, then the bail support member 45 can be mounted in such a manner that it can be reversed between the fishing line take-up and play-out positions.

Figure 22:
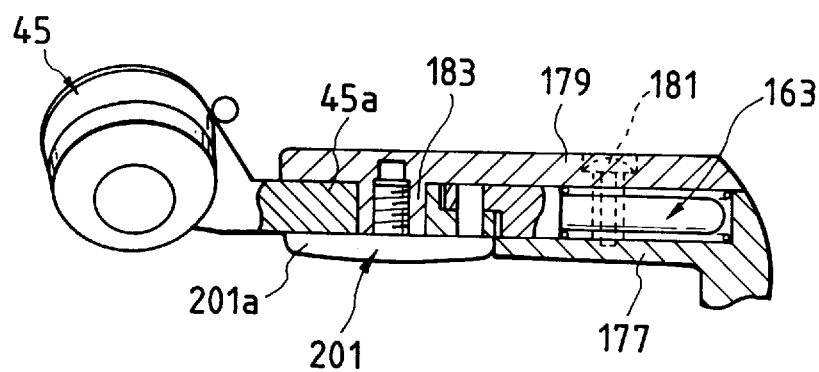
FIG. 22 is a section view of a support arm provided in a rotor employed in an eleventh embodiment of a spinning reel according to the invention.

Now, FIG. 22 shows an eleventh embodiment of a spinning reel according to the invention. The present embodiment is a modified version of the embodiment shown in FIG. 20. In the present embodiment, the base portion 45a of the bail support member 45 is so formed as to have a thickness which prevents the base portion 45a from projecting outwardly of the support arm 177, the head portion 201a of a screw 201 for journaling the bail support member 45 onto the support shaft 183 is formed in such a manner that it has a large diameter, and the present head portion 201a is used to secure the bail support member 45 against removal.

Similarly to the previously described embodiments, the expected object of the present invention can be achieved by these embodiments.

Figure 23:
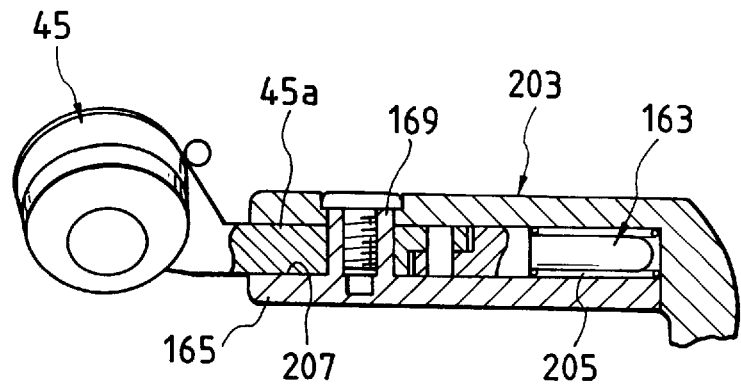
FIG. 23 is a section view of a support arm provided in a rotor employed in a twelfth embodiment of a spinning reel according to the invention.

FIG. 23 shows a twelfth embodiment of a spinning reel according to the invention. In the embodiment shown in FIG. 18, the cover 165 including the support shaft 169 is mounted on the surface side of the support arm 155. On the other hand, according to the present embodiment, there is formed a recess-like storage portion 205 in the radially inner side of a support arm 203. The present storage portion 205 and cover 165 cooperate in forming a mounting portion 207 in the leading end portion of the support arm 203 for mounting the bail support member 45, and the bail support member 45 is mounted on the support shaft 169 in such a manner that it can be reversed between its fishing line take-up and play-out positions.

Figure 24:
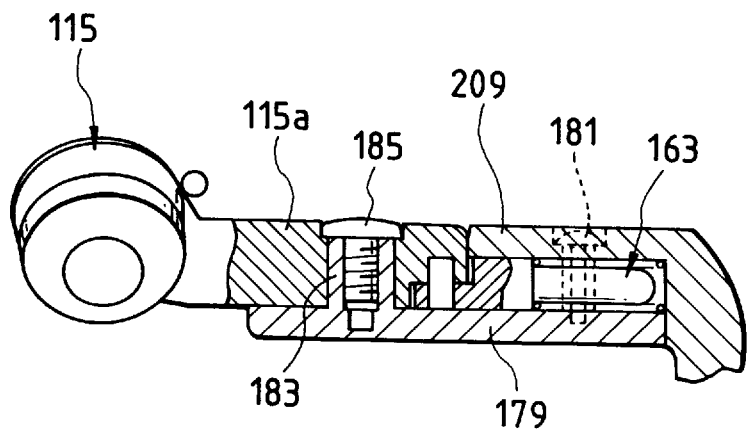
FIG. 24 is a section view of a support arm provided in a rotor employed in a thirteenth embodiment of a spinning reel according to the invention.

Now, FIG. 24 shows a thirteenth embodiment of a spinning reel according to the invention. In the embodiment shown in FIG. 20, the cover 179 including the support shaft 183 is mounted on the surface side of the support arm 177. On the other hand, according to the present embodiment, a cover 179 is mounted on the radially inner side of a support arm 209, the present support arm 209 is formed shorter than the cover 179, the base portion 115a of the bail support member 115 is so formed as to have a thickness which produces no level difference between the support arm 209 and the present base portion 115a, and the bail support member 115 is mounted on the support shaft 183 provided in the cover 179 in such a manner that it can be reversed between the fishing line take-up and play-out positions thereof.

Due to this, according to these respective embodiments as well, the fishing line can be prevented from becoming entangled during the fishing operation of the spinning reel and also the diameter of the spool can be increased without increasing the sizes of the rotor and reel main body.

Figure 25:
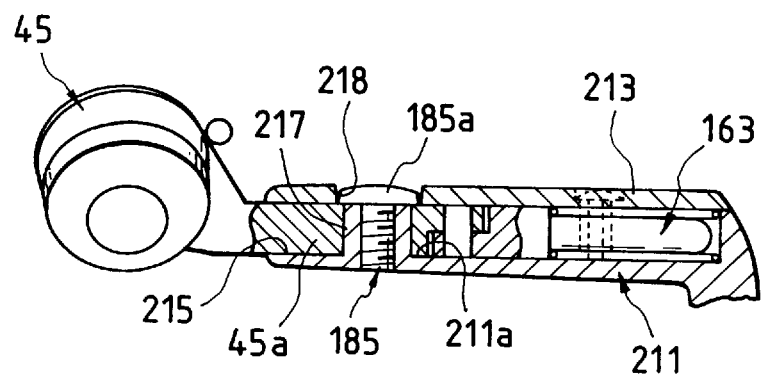
FIG. 25 is a section view of a support arm provided in a rotor employed in a fourteenth embodiment of a spinning reel according to the invention.

Now, FIG. 25 shows a fourteenth embodiment of a spinning reel according to the invention. In the present embodiment as well, similarly to the embodiment shown in FIG. 1, a support arm 211 and a cover 213 to be mounted on the surface of the support arm 211 cooperate in forming a mounting portion 215 in the leading end portion of the support arm 211 for mounting the bail support member 45, and the base portion 45a of the bail support member 45 is journaled on the support shaft 217 which is provided on and projected from the inner surface 211a of the support arm 211. In the present embodiment, a screw 185 is screwed into a support shaft 217 from a mounting hole 216 formed in the cover 213, and the head portion 185a of the screw 185 is used to secure the bail support member 45 against removal. The present head portion 185a is set such that it is prevented from projecting out of the surface of the cover 213.

Figure 26:
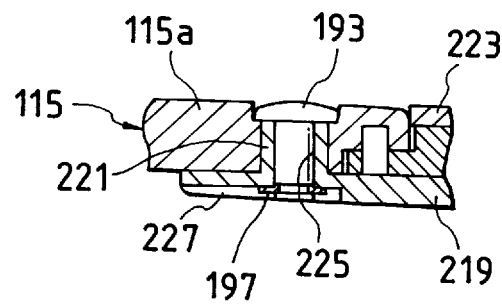
FIG. 26 is a partial section view of a support arm provided in a rotor employed in a fifteenth embodiment of a spinning reel according to the invention.

Now, FIG. 26 shows a section view of the main portions of a mounting structure for mounting a bail support member employed in a fifteenth embodiment of a spinning reel according to the invention. In the present embodiment as well, not only is the base portion 115a of a bail support member 115 journaled on a support shaft 221 provided on the leading end side of a support arm 219 and not only is the present bail support member 115 mounted in such a manner that it can be reversed between the fishing line take-up and play-out positions thereof but also, in order to prevent the entanglement of the fishing line during the fishing operation of the spinning reel, the base portion 115a of the bail support member 115 is so for med as to have a thickness which produces no level difference between a cover member 223 and the base portion 115a. Further, according to the present embodiment, instead of the screw, there is used a pin 193, that is, the support member 115 is mounted by use of the pin 193 in such a manner that the support member 115 can be reversed between the fishing line take-up and play-out positions thereof.

That is, as shown in FIG. 26, in the above-mentioned support shaft 221, there is formed a pin insertion hole 225. Also, on the back surface of the support arm 219, there is formed a cut-out portion 227 which is used to mount a retainer 197 onto the insertion side leading end portion of the pin 193. In particular, if the pin 193 is inserted into the pin insertion hole 225 and the retainer 197 is mounted onto the insertion side leading end portion of the pin 193, then the bail support member 115 can be mounted in such a manner that it can be reversed between the fishing line take-up and play-out positions thereof.

In this manner, according to these respective embodiments as well, the fishing line can be prevented from getting entangled during the fishing operation of the spinning reel and also the diameter of the spool can be increased without increasing the sizes of the rotor and reel main body.

Figure 27:
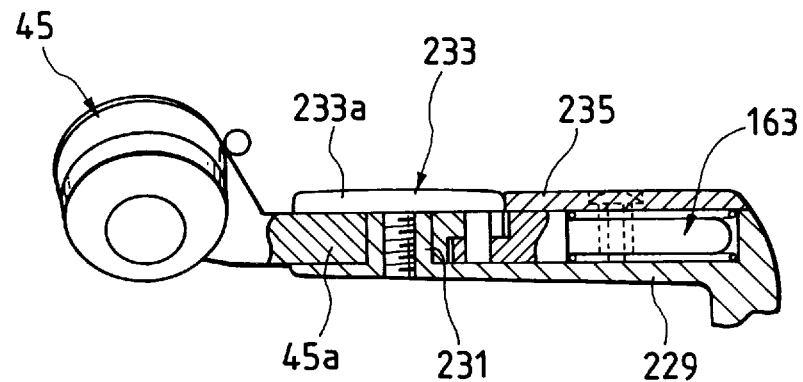
FIG. 27 is a section view of a support arm provided in a rotor employed in a sixteenth embodiment of a spinning reel according to the invention.

Now, FIG. 27 shows a sixteenth embodiment of a spinning reel according to the invention. In the present embodiment as well, the base portion 45a of the bail support member 45 is journaled on a support shaft 231 provided on the leading end side of a support arm 229 and the present bail support member 45 is mounted in such a manner that it can be reversed between the fishing line take-up and play-out positions thereof. The base portion 45a of the bail support member 45 is so formed as to have a thickness which prevents the base portion 45a from projecting outwardly of the support arm 229. Similarly to the embodiment shown in FIG. 22, the head portion 233a of a screw 233 for journaling the bail support member 45 on the support member 231 is formed in such a manner that it has a large diameter, and the present head portion 233a is used to prevent the bail support member 45 against removal. The present head portion 233a is formed flush with a cover 235.

Figure 28:
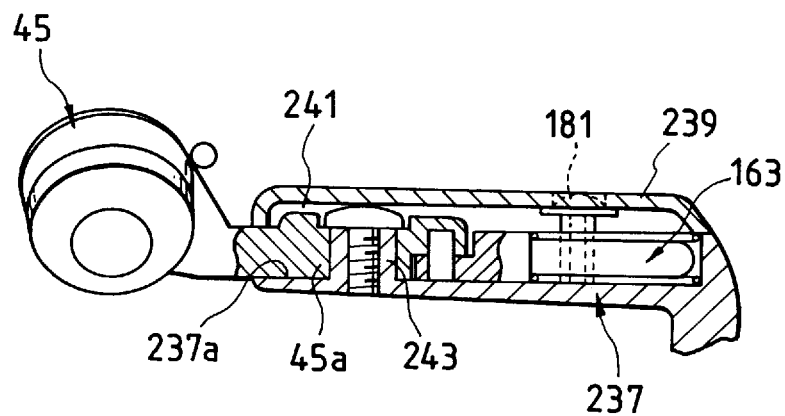
FIG. 28 is a section view of a support arm provided in a rotor employed in a seventeenth embodiment of a spinning reel according to the invention.

Now, FIG. 28 shows a seventeenth embodiment of a spinning reel according to the invention. In the present embodiment as well, similarly to the first embodiment shown in FIG. 1, a support arm 237 and a cover 239 to be mounted on the surface of the support arm 237 cooperate in forming a mounting portion 241 in the leading end portion of the support arm 237 for mounting the bail support member 45, and the base portion 45a of the bail support member 45 is journaled on a support shaft 243 which is provided on and projects from the inner surface 237a of the support arm 237. In the present embodiment, there is provided a slight clearance between the cover 239 and an urging device 163 or the base portion 45a of the bail support member 45.

Figure 29:
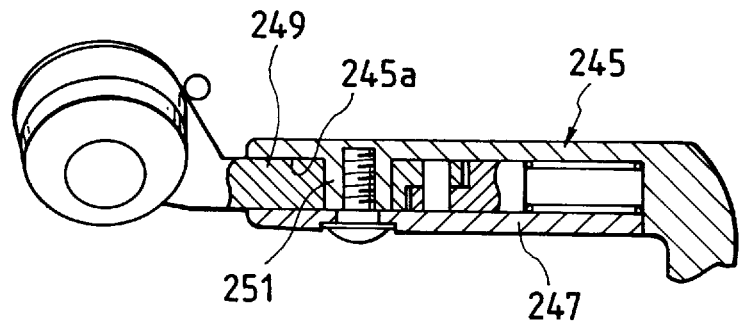
FIG. 29 is a section view of a support arm provided in a rotor employed in an eighteenth embodiment of a spinning reel according to the invention.

FIG. 29 shows an eighteenth embodiment of a spinning reel according to the invention. In the present embodiment an well, a support arm 245 and a cover 247 cooperate in forming a mounting portion 249 in the leading end portion of the support arm 245 for mounting the bail support member 45, and the base portion 45a of the bail support member 45 is journaled on a support shaft 251 which is provided on and projects from the inner surface 245a of the support arm 245. In the present embodiment, unlike the previously described embodiments, the cover 247 is mounted on the back surface side (the radially inner side) of the support arm 245.

Figure 30:
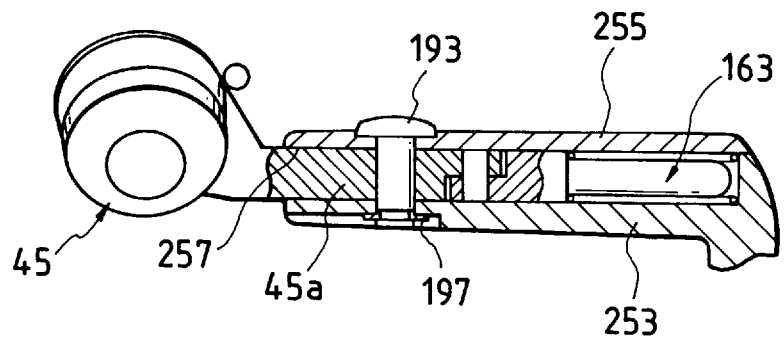
FIG. 30 is a section view of a support arm provided in a rotor employed in a nineteenth embodiment of a spinning reel according to the invention.

FIG. 30 shows a nineteenth embodiment of a spinning reel according to the invention. In the present embodiment as well, a support arm 253 and a cover 255 cooperate in forming a mounting portion 257 in the leading end portion of the support arm 253 for mounting the bail support member 45, and the base portion 45a of the bail support member 45 is so formed as to have a thickness which prevents the present base portion 45a from projecting outwardly of the support arm 253. In the present embodiment, a pin 193 serving as a mounting shaft is inserted through the support arm 253, the base portion 45a of the bail support member 45 and the cover 255, and a retainer 197 is mounted on the insertion side leading end portion of the pin 193, whereby the bail support member 45 is mounted in such a manner that it can be reversed between the fishing line take-up and play-out positions thereof.

Figure 31:
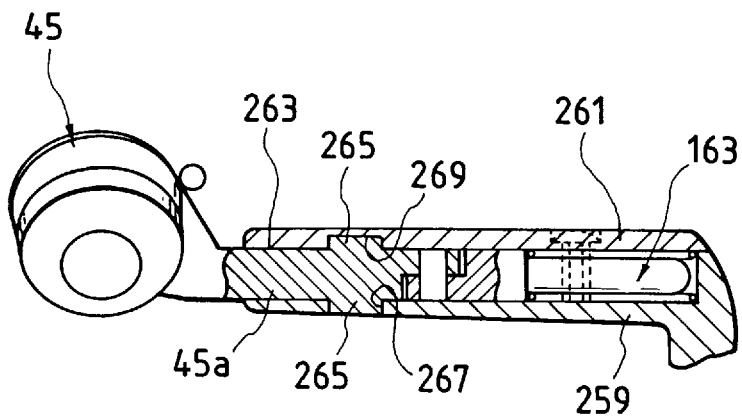
FIG. 31 is a section view of a support arm provided in a rotor employed in a twentieth embodiment of a spinning reel according to the invention.

FIG. 31 shows a twentieth embodiment of a spinning reel according to the invention. In the present embodiment as well, a support arm 259 and a cover 261 to be mounted on the surface of the support arm 259 cooperate in forming a mounting portion 263 in the leading end portion of the support arm 259 for mounting the bail support member 45. In addition to this, according to the present embodiment, a pair of support shafts 265 projecting toward the support arm 259 and cover 261 are provided coaxially to each other on the base portion 45a of the bail support member 45, and the present support shafts 265 are journaled in mounting holes 267 and 269 respectively formed in the support arm 259 and cover 261, whereby the bail support member 45 is mounted in such a manner that it can be reversed between the fishing line take-up and play-out positions thereof.

Figure 32:
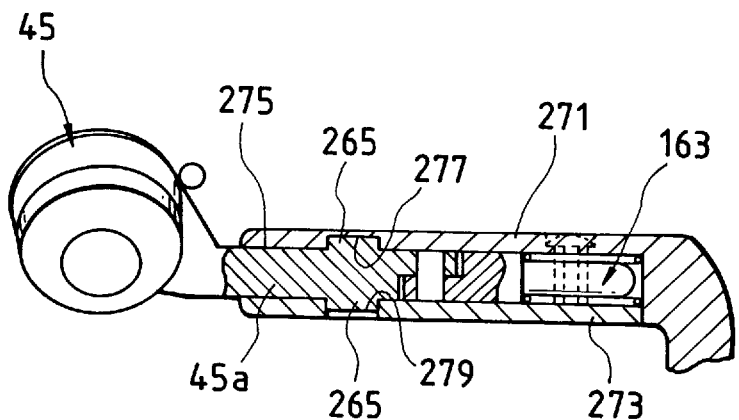
FIG. 32 is a section view of a support arm provided in a rotor employed in a twenty-first embodiment of a spinning reel according to the invention.

Now, FIG. 32 shows a twenty-first embodiment of a spinning reel according to the invention. In the present embodiment, unlike the embodiment shown in FIG. 31, a cover 273 is mounted on the back surface Bide of a support arm 271, the present cover 273 and support arm 271 cooperate in forming a mounting portion 275 in the leading end portion of the support arm 271 for mounting the bail support member 45, and a pair of support shafts 265 provided on and projected from the base portion 45a of the bail support member 45 are journaled in mounting holes 277 and 279 respectively formed in the cover 273, whereby the bail support member 45 is mounted in such a manner that it can be reversed between the fishing line take-up and play-out positions thereof.

Figure 33:
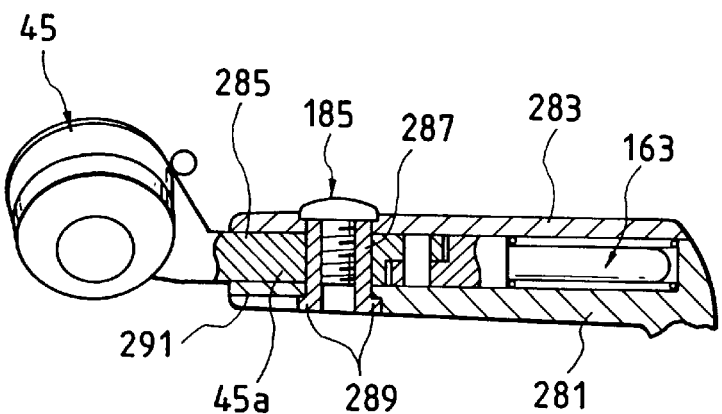
FIG. 33 is a section view of a support arm provided in a rotor employed in a twenty-second embodiment of a spinning reel according to the invention.
Figure 34:
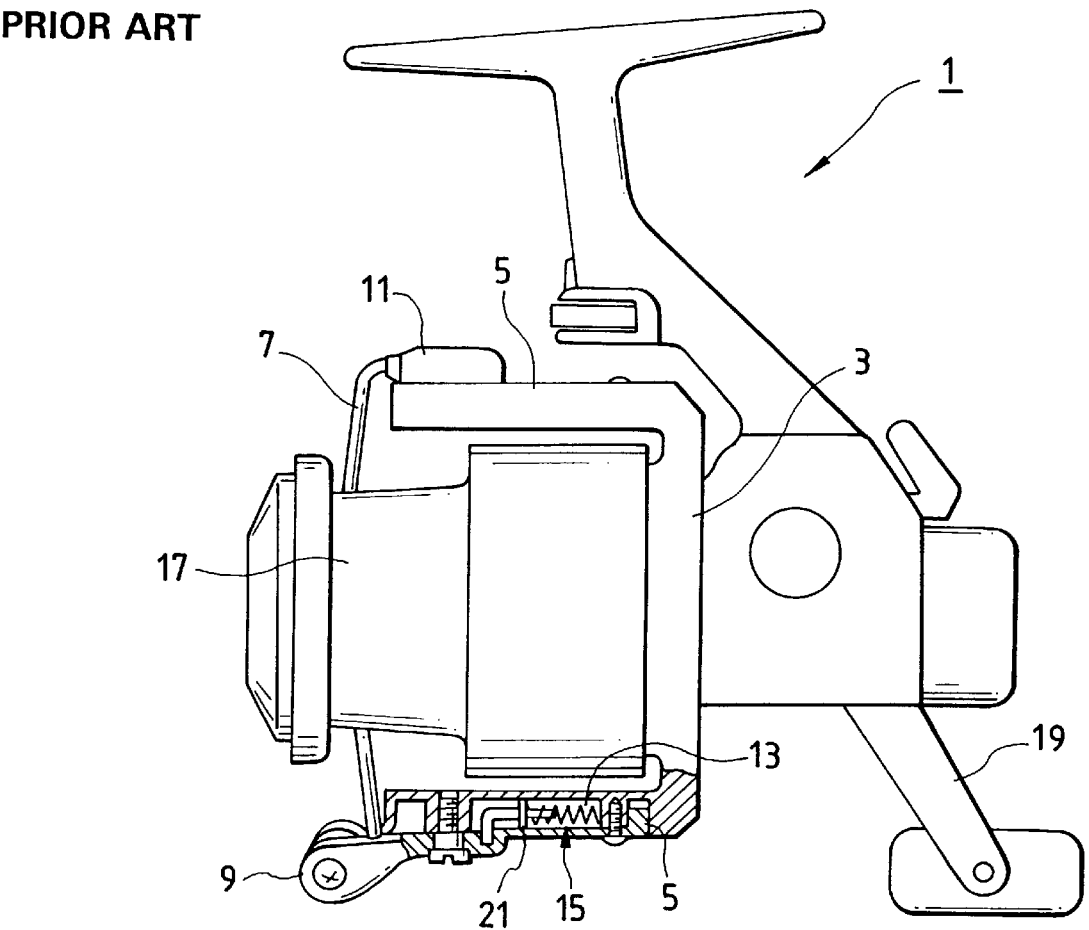
FIG. 34 is a side view, partly in section, of the main portions of a conventional spinning reel.
Figure 35:
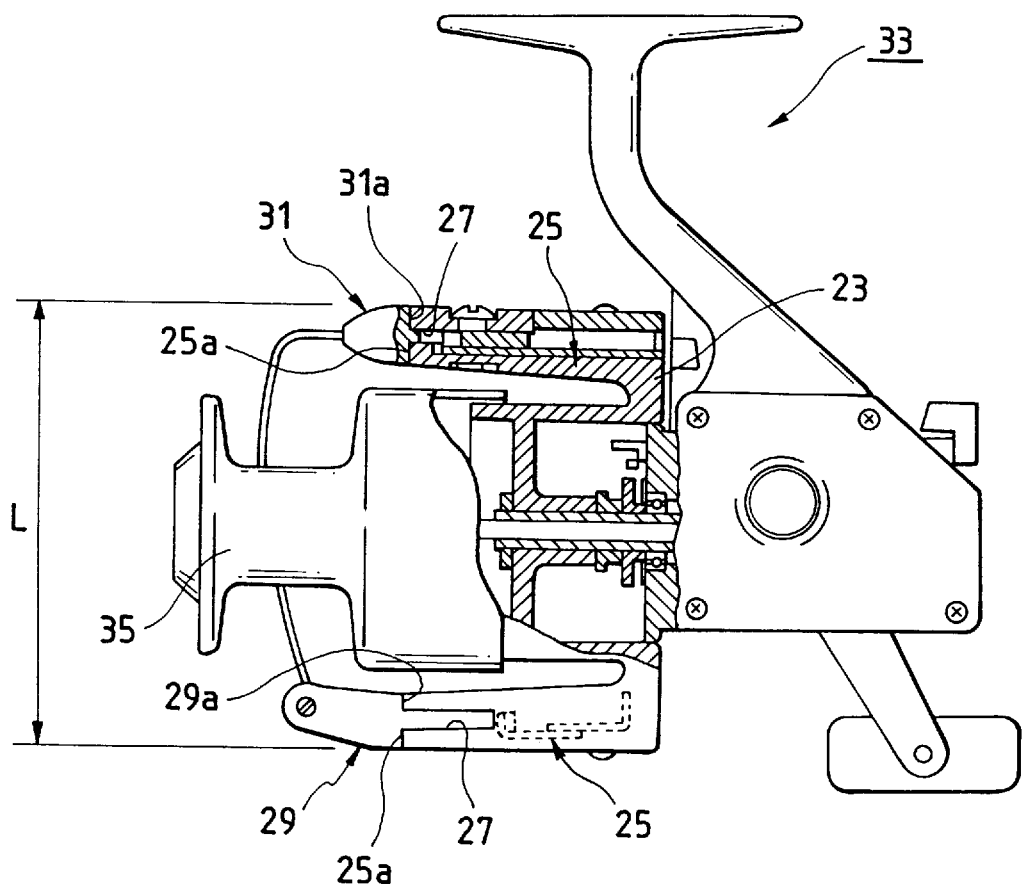
FIG. 35 is a side view, partly in section, of the main portions of another conventional spinning reel.

Now, FIG. 33 shows a twenty-second embodiment of a spinning reel according to the invention. In the present embodiment as well, similarly to the embodiment shown in FIG. 30, a support arm 281 and a cover 283 to be mounted on the surface of the support arm 281 cooperate in forming a mounting portion 285 in the leading end portion of the support arm 281 for mounting the bail support member 45, and the base portion 45a of the bail support member 45 is so formed as to have a thickness which prevents the base portion 45 from projecting outwardly of the support arm 281. In the present embodiment, a cylindrically-shaped mounting shaft 287 is provided to pass through the support arm 281, the base portion 45a of the bail support member 45 and the cover 283, and the base portion 45a of the bail support member 45 is journaled on the mounting shaft 287 by use of a screw 185.

In addition, in FIG. 33, reference character 289 designates a stopper which is provided in the mounting shaft 287. When the base portion 45a is screwed to the mounting shaft 287 by the screw 185, the present stopper 289 is engaged with a cut-out portion 291 formed in the support arm 281.

Figure 36:
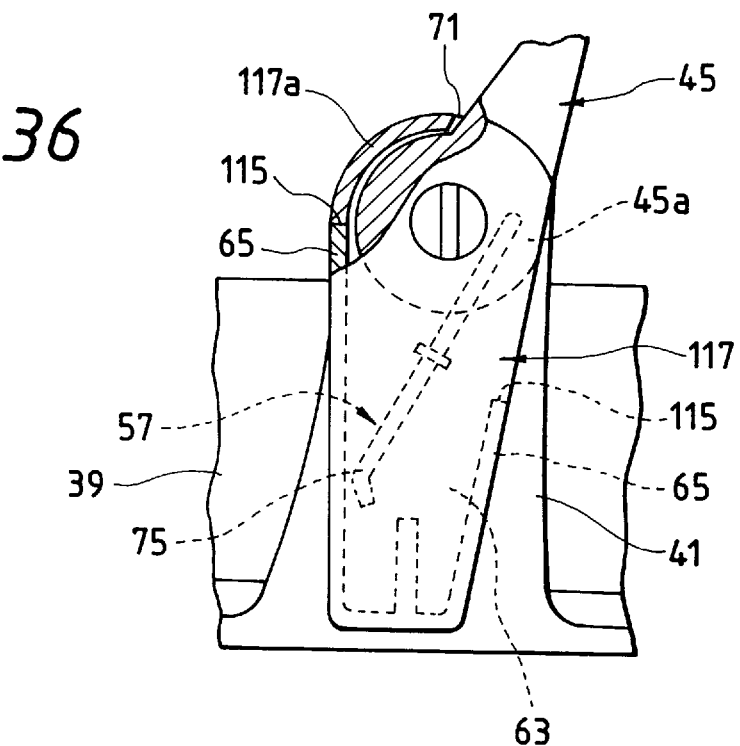
FIG. 36 is a side view, partly in section, of the main portions of a rotor employed in a twenty-third embodiment of a spinning reel according to the invention.
Figure 37:
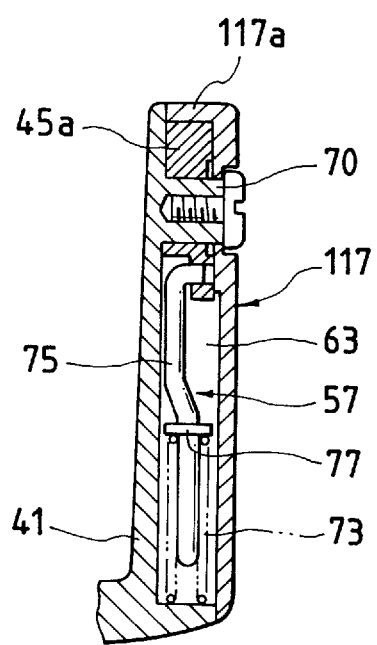
FIG. 37 is a section view of a support arm provided in the rotor shown in FIG. 36.

FIGS. 36 and 37 show a support arm provided in a rotor employed in a twenty-third embodiment of a spinning reel according to the invention. In the first embodiment, in the peripheral wall 65 erected along the peripheral edge portion of the support arm 41, there is formed the cut-out portion 67 extending over the reversal area ranging from the fishing line take-up position of the bail support member 45 to the fishing line play-out position thereof so that the front wall 65a of the peripheral wall 65 is extended up to the leading end portion of the support arm 41. On the other hand, according to the present twenty-third embodiment, as shown in FIGS. 36 and 37, there is formed a cut-out portion 115 in such a manner that it is extended up to the rotor take-up rotation direction side thereof along the reverse direction of the bail support member 45, a wall portion 117a for closing the rotor take-up rotation direction side of the cut-out portion 115 is formed integrally with the leading end portion of a cover 117 which is fixed to the outside of the support arm 41 and is used to cover the whole of a storage portion 63, the bail support member 45 is inserted into an opening 71 formed by the cover 117 and cut-out portion 115, and the base portion 45a of the bail support member 45 is slidably mounted on the inner surface 63a of the storage portion 63 through a support shaft 70. That is, since the rotor take-up rotation direction side of the cut-out portion 115 is closed by the wall portion 117a, the opening 71 is opened over a reversal area ranging from the fishing line take-up position of the bail support member 45 to the fishing line play-out position of the bail support member 45.

Since the remaining portions of the structure of the present embodiment are the same as those of the previously-mentioned first embodiment, they are given the same designations and the description thereof is omitted here.

Thus, according to the present embodiment as well as other embodiments, there is eliminated the possibility that the fishing line can be entangled during the fishing operation, which makes it possible to achieve an expected object of the invention.

FIGS. 38 to 41 show a twenty-fourth embodiment of the present invention. This embodiment is constructed such that the mounting structure including the support arm 237, the cover 239 and so on for mounting the bail support member 45 according to the seventeenth embodiment shown in FIG. 28 is provided on a spinning reel 361 substantially equivalent to the spinning reel of the first embodiment, and that a spool 337, which is applicable to any one of the previously described embodiments, is mounted on the spinning reel 361.

Figure 38:
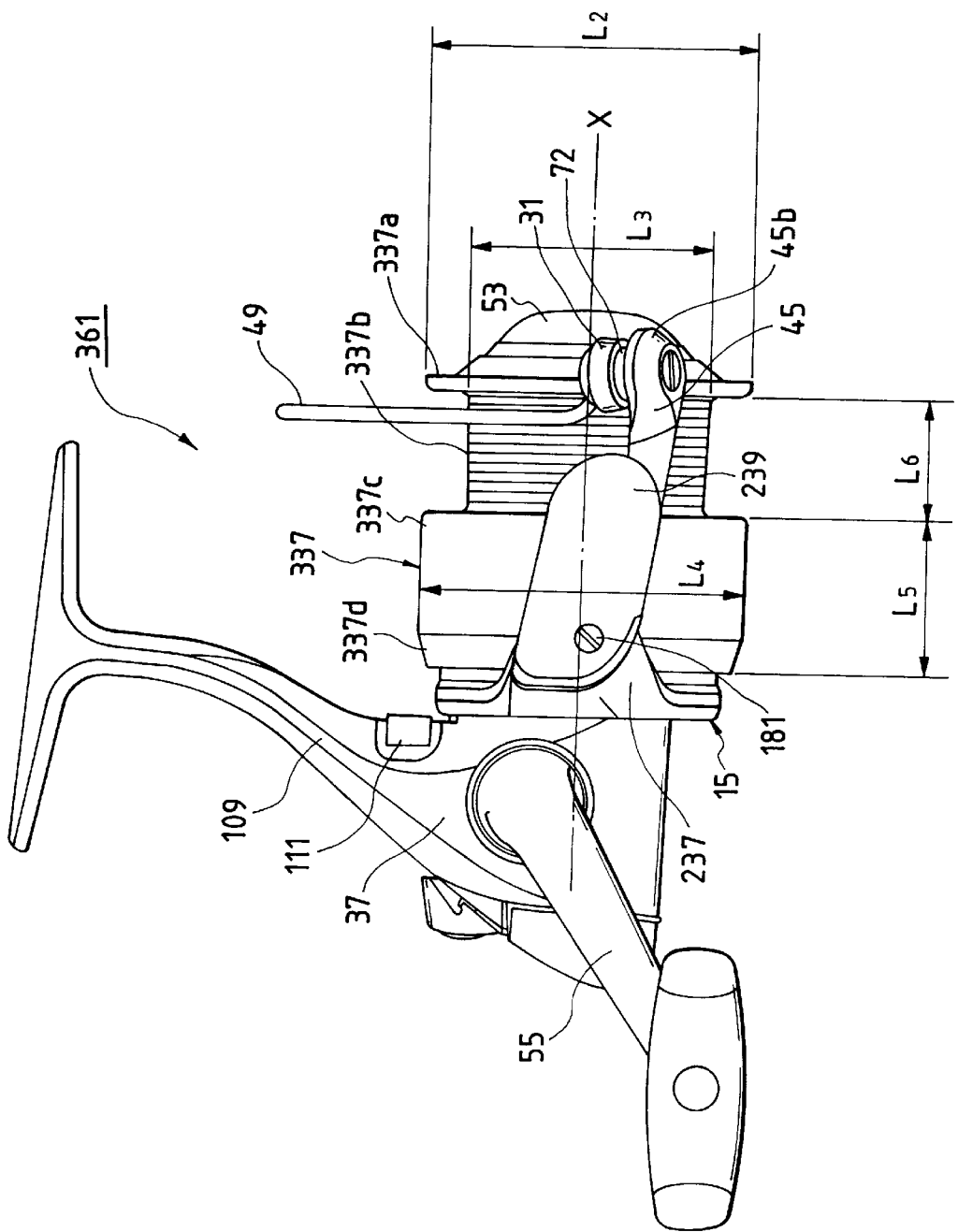
FIG. 38 is a side view of the main portions of a twenty-fourth embodiment of a spinning reel for fishing according to the invention.
Figure 40:
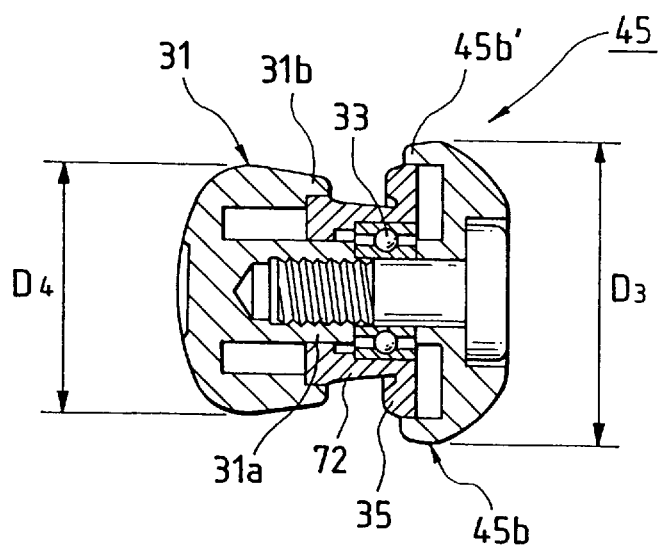
FIG. 40 is an enlarged section view of portions for mounting a line roller in the spinning reel for fishing shown in FIG. 38.

As shown in FIGS. 38 and 40, the bail support member 45 is pivotably supported on the support arm 237 and has the leading end portion 45b to which a line slider 31 T-shaped in section is fixed through a shaft portion 31a by a bolt or screw. The bail 49 is fixed to the line slider 31. The line roller 72 is rotatably supported by the ball bearing 33 axially interposed between the shaft portion 31a and the leading end portion 45b of the bail support member 45.

Figure 41:
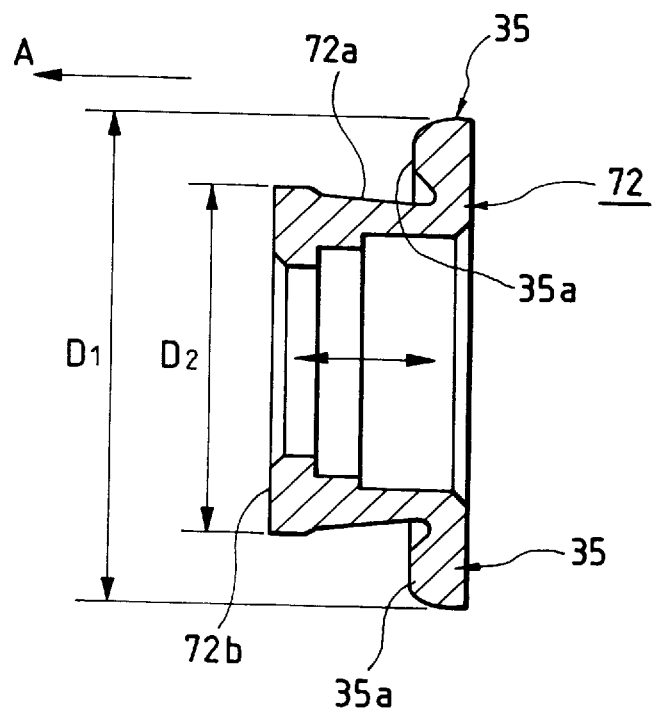
FIG. 41 is an enlarged section view of the line roller in the spinning reel shown in FIG. 38.

The line roller 72 has such a shape, as shown in FIGS. 40 and 41, that the fishing line guide portion 72a is tapered so that the diameter is gradually increased in the direction from the bail support member 45 toward the line slider 31, i.e. in the fishing line take-up direction (arrow A) of the rotor 15.

The fishing line guide portion 72a is integrally formed with a substantially circular plate-like guide portion 35 adjacent the leading end portion 45b of the bail support member 45, which is brought into contact with the fishing line during winding operation so as to restrict the axial motion of the fishing line with respect to the line roller 72, to thereby stabilize a line pass around the line roller 72. More specifically, since the line roller 72 together with the rotor 15 rotates around the spool 337, the relative position of the line roller 72 with respect to a guide provided on a rod, the diameter of the fishing line which has been wound on the spool 337, the axial position of the spool making traverse motion in the front-to-rear direction and so on adversely affect on the position of the fishing line, that is to say, the fishing line attempts to move in the axial direction irregularly on the guide portion 72a of the line roller 72. However, the line roller 72 according to the present invention can positively restrict such irregular, axial motion of the fishing line, because of the tapered configuration of the guide portion 72a in cooperation with the provision of the guide portion 35.

Further, as described above, the line roller 72 employed in the spinning reel of the present invention has such a tapered shape that the diameter of the fishing line guide portion 72a gradually increases in the fishing line take-up direction A of the rotor 15. Therefore, the friction caused between the line roller 72 and the fishing line is larger at the diameter larger side rather than at the diameter smaller side. Consequently, when the fishing line is guided by the line roller 72 to be wound onto the spool 37, twists are positively produced on the fishing in the direction opposite to the direction in which twists are produced on the fishing line when the wound fishing line is released or played out from the spool. Conventionally, the spinning reel for fishing structurally suffers from a problem in that twists in the line that are produced on the fishing line when the wound fishing line is released or played out from the spool, accumulate on the fishing line by repetition of taking-up and playing-out of the fishing line and such accumulated twists cause the cutting and the entanglement of the fishing line. However, according to the present invention, by positively producing the twists on the fishing line with the tapered configuration of the fishing line guide roller 72 when the fishing line is wound onto the spool, the casting twists can be canceled by the winding twists when the fishing line is played out from the spool subsequently. Therefore, the spinning reel of the present invention is free from the problem in that the fishing line is cut and/or entangled due to the accumulated fishing line twists.

The guide portion 35 is located radially outwardly relative to the outer periphery of the opposite end portion 72b of the line roller 72. The guide portion 35 defines a fishing line contact surface 35a which is a planer surface orthogonal to the axis of the line roller and with which the fishing line is brought into contact during the fishing line take-up operation.

It is preferable that the outer diameter $D_1$ of the guide portion 35 is set larger than the outer diameter $D_2$ of the opposite end portion 72b by an amount equal to or more than 1 mm. It is set larger by an amount more than 2 mm, then the sliding contact of the fishing line contact surface 35a with the fishing line becomes more gentle and preferable.

Figure 42:
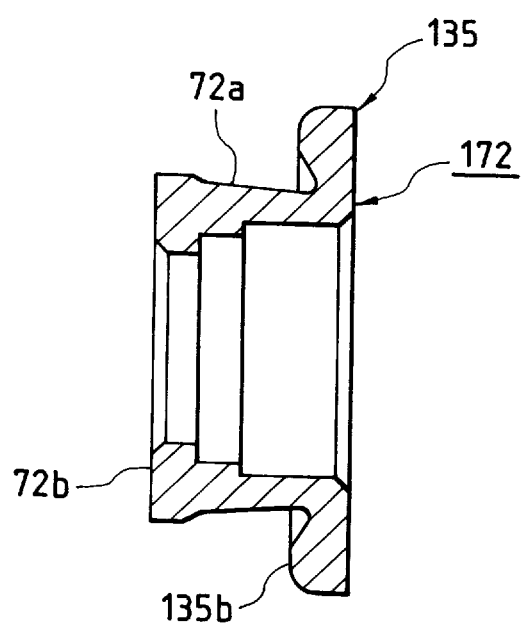
FIG. 42 is an enlarged section view showing a modification of the line roller.

Since the outer diameter of the guide portion 35 is set larger than the outer diameter of the opposite end 72b so as to increase the contact area of the fishing line contact surface 35a and since the fishing line contact surface 35a is formed as a planar surface, the partial and local deformation and forcible slide are prevented from being applied on the fishing line, and thus it is possible to decrease the damage on the fishing line. In addition, as shown in FIG. 42, the fishing line contact surface may be formed as a curved surface 135b.

In FIG. 40, reference numerals 45b' and 31b designate annular projections, which are respectively provided on the leading end portion 45b and the line slider 31 and which respectively circumscribe the guide portion 35 and the opposite end portion 72b of the line roller 72, for preventing the biting of the fishing line. As a consequence of the structure that the opposite end portion 72b of the line roller 72 is made smaller in comparison to the guide portion 35, the outer diameter $D_4$ of the annular projection 31b on the line slider 31 can be made smaller than the outer diameter $D_3$ of annular projection 45b' on the leading end portion 45b of the bail support member 45. Therefore, the line slider 31 can be made smaller in size and weight, and thus the rotor 15 can be made smaller in weight totally. Further, this weight reduction of the line slider 31 also meets the recent technical requirement that the heavier weight should not be distributed forwardly in view of the good rotation balance of the rotor 15.

As shown in FIG. 38, the spool 337, which is applicable to any one of previously described embodiments, includes a front side flange portion 337a, a fishing line winding barrel portion 337b and a rear side flange portion (skirt portion) 337c. The barrel portion 337b of this embodiment, as similarly to the seventh embodiment, is reversely tapered such that the diameter of the barrel portion gradually decreases as it approaches the rear side flange portion 337c from the front side flange portion 337a. This reversely tapered design for the barrel portion 337b is directed to preventing the collapse of the fishing line wound on the barrel portion 337b when the fishing line is played out.

The spool 337 is further characterized in that the diameter of the fishing line winding barrel portion 337b is set larger in comparison to the conventional spinning reel, and that the rear end 337d of the rear side flange portion 337c is bent radially inwardly. The design of the radially inwardly bent rear end 337b makes it possible to increase the diameter of the spool 337 without increasing the diameter of the rotor 15. Consequently, it is possible to increase the winding amount of the fishing line and enhance the fishing line releasing (playing-out) ability, which are advantages provided from the increased diameter of the spool 337 as well as to prevent the collapse of the fishing line from the barrel portion 337c when the fishing line is played out. Further, since it is not necessary to increase the diameter of the rotor 15, the above-noted advantages can be obtained without increasing the entire reel in size and weight.

In the spinning reel according to the twenty-fourth embodiment of the present invention, the fishing line winding barrel portion 337b is tapered at an angle of 0.5° to 5° with respect to the axis X so that a diameter of the fishing line winding barrel portion 337b gradually decreases from the front side flange portion 337a to the rear side flange portion 337c, and an axial length $L_5$ of the rear side flange portion 337c along the axis X is larger than an axial length $L_6$ of the fishing line winding barrel portion 337c. According to the combination of these designs for the spool 337, a proper friction is applied onto a fishing line when the fishing line is released (played out) from the spool 337 and thus it is possible to prevent the backlash of the fishing line and the looseness of the fishing line. Because of the above-noted advantage, it is possible to fully wind the fishing line onto the fishing line barrel portion 337b up to the outer periphery of the front side flange portion 337a, to thereby increase the flying or casting distance of the fishing hooks.

In the spinning reel according to the twenty-fourth embodiment of the present invention, the fishing line winding barrel portion 337b in tapered with respect to the axis x so that a diameter of the fishing line winding barrel portion 337b gradually decreases from the front side flange portion 337a to the rear side flange portion 337c, and a roar end 337d of the rear side flange portion 337c is tapered so that a diameter of the rear end 337d gradually decreases rearwardly. Accordingly, the reverse taper design of the fishing line winding barrel portion 337b prevents the fishing line from being loosened in such a manner that the bundle of the wound fishing line is shifted forwardly of the spool 337. Further, even if the loosened fishing line is shifted rearwardly, the loop of the loosened fishing line fallen down onto the rotor 15 rearwardly is much larger in diameter than the cylindrical portion of the rotor 15 because of the tapered design of the rear end 337c of the rear side flange portion 337c, and therefore it is easy to return the loosened fishing line back to the fishing line winding barrel portion 337b. In addition, the tapered design of the rear end 337d of the rear side flange portion 337c makes it possible to decrease the diameter of the cylindrical portion of the rotor 15 without increasing the radial clearance between the cylindrical portion of the rotor 15 and the rear side flange potion 337c of the spool 337.

In the spinning reel according to the twenty-fourth embodiment, a diameter $L_2$ of the front side flange portion 337a relative to a distance $L_1$ defined between outer surfaces of the support arms 43 and 45 is set at 0.6 to 0.8, and a rear end 337d of the rear side flange portion 337c is tapered so that a diameter of the rear end 337d gradually decreases rearwardly. The combination of these designs enables enlarging the diameter of the spool 337 without increasing the entire size of the spinning reel. Further, owing to the tapered configuration of the rear end 337d of the rear side flange portion 337c of the spool 337, it is possible to maintain the performance of preventing the rearward shifting of the fishing line as well as to decrease the diameter of the cylindrical portion of the rotor 15.

In the spinning reel according to the twenty-fourth embodiment, a diameter $L_4$ of the rear side flange portion 337c relative to a diameter $L_2$ of the front side flange portion 337a is set at 0.95 to 1.05. Accordingly, a proper friction is applied onto a fishing line when the fishing line is released (played out) from the spool 337 and thus it is possible to prevent the backlash of the fishing line and the looseness of the fishing line. Because of the above-noted advantage, it is possible to fully wind the fishing line onto the fishing line barrel portion 337c up to the outer periphery of the front side flange portion 337a, to thereby increase the flying or casting distance of the fishing hooks.

By the way, as in the above-mentioned respective embodiments, in a spinning reel of this type, the bail support member is mounted on the support arm. However, conventionally, there are available a large number of spinning reels which do not employ any bail. In such spinning reels for fishing, a support member equivalent to the above-mentioned bail support member is attached to a support arm and a line roller is mounted thereon. The present invention can also apply to the spinning reels having such structure.

Also, in the above-mentioned embodiments, the ratio of the outside diameter dimension $L_2$ of the front side flange portion of the spool with respect to the outer width dimension $L_1$ of the support arm of the rotor is set 70%. However, according to the invention in which the thickness of the support arm is reduced, this ratio can be set in the range of 60% to 80%.

As has been described heretofore, with use of a spinning reel according to the invention as set forth in the respective claims, the diameter of the spool can be increased without increasing the sizes of the rotor and reel main body when compared with the conventional spinning reel, and the fishing line can be positively prevented from twining in the fishing operation of the spinning reel, so that the increased diameter of the spool can be realized without impairing the efficiency of the fishing operation of the spinning reel and thus the practical use of the spinning reel can be improved further.

What is claimed is:

1. A spinning reel for fishing for winding a fishing line onto a spool with a rotor rotatable about a first axis, wherein:
   said rotor includes a pair of support arms and a cover is attached to at least one of said support arms;
   said at least one support arm and said cover cooperatively form a mounting portion for pivotably mounting a base portion of a support member to which a bail is fixed;
   an imaginary plane is defined, which contains the first axis and intersects both of said support arms;
   a peripheral wall is erected from and elongated along a peripheral edge of said mounting portion so that said peripheral wall adjacent said base portion of said support member extends from a fishing line take-up side across the imaginary plane to a fishing line play-out side; and
   said peripheral wall defines a cut-out portion which permits a pivot motion of said support member and which is entirely located within the fishing line play-out side.

2. A spinning reel for fishing according to claim 1, wherein said peripheral wall is provided on said at least one support arm.

3. A spinning reel for fishing according to claim 1, wherein said peripheral wall is provided on said cover.

4. A spinning reel for fishing according to claim 1, wherein an inner surface of said at least one support arm with which the base portion of said support member is slidingly contacted and a surface of said cut-out portion with which said base portion of said support member is slidingly contacted lie on a common plane.

5. A spinning reel for fishing according to claim 4, wherein an inner surface of said cover with which said base portion of said support member is slidingly contacted and a surface of said cut-out portion with which said base portion of said support member is slidingly contacted lie on another common plane.

6. A spinning reel for fishing according to claim 1, wherein an inner surface of said cover with which said base portion of said support member is slidingly contacted and a surface of said cut-out portion with which said base portion of said support member is slidingly contacted lie on a common plane.

7. A spinning reed for fishing according to claim 1, wherein said peripheral wall terminates at a location substantially aligned on a pivot axis of said support member along a direction of the first axis.

8. A spinning reel for fishing according to claim 1, wherein a closing member is provided for closing said cut-out portion in association with a pivot motion of said support member.

9. A spinning reel for fishing according to claim 1, wherein for two positions of said rotor relative to said:

the imaginary plane constitutes a first imaginary plane;

an imaginary second plane extends along the first axis and through a leg portion of said spinning reel as a plane of symmetry that bisects said spinning reel, including said rotor into substantially symmetrical halves, and the imaginary first plane extends perpendicularly to the imaginary second plane.

10. A spinning reel for fishing for winding a fishing line onto a spool with a rotor rotatable about a first axis, wherein:

said rotor includes a pair of support arms;

a support shaft is formed on and protrudes from an inner surface of at least one of said support arms for mounting a base portion of a support member to which a bail is fixed so that said support member is pivotable about a second axis;

an imaginary plane is defined, which contains the first axis and intersects both of said support arms;

a peripheral wall is erected from and elongated along a peripheral edge of said at least one support arm so that said peripheral wall has a curved front wall which circumscribes said base portion of said support member about the second axis and terminates substantially on the imaginary plane to define a cut-out portion located entirely within a fishing line play-out side with respect to the imaginary plane.

11. A spinning reel for fishing according to claim 10, wherein a thickness of said base portion of said support member is substantially equal to an amount by which said peripheral wall is erected and projects from the inner surface of said at least one support arm.

12. A spinning reel for fishing according to claim 10, wherein for two positions of said rotor relative to said spinning reel:

the imaginary plane constitutes a first imaginary plane;

an imaginary second plane extends along the first axis and through a leg portion of said spinning reel as a plane of symmetry that bisects said spinning reel into substantially symmetrical halves, and wherein the imaginary first plane extends perpendicularly to the imaginary second plane.

13. A spinning reel for fishing for winding fishing line onto a spool with a rotor rotatable about a first axis, wherein:

said rotor includes a pair of support arms, and a cover attached to at least one of said support arms;

a support shaft is formed on and protrudes from an inner surface of said cover for mounting a base portion of support member to which a bail is fixed so that said support member is pivotable about a second axis;

an imaginary plane is defined, which contains the first axis and intersects both of said support arms;

a peripheral wall is erected from and elongated along a peripheral edge of said cover so that said peripheral wall has a curved front wall which circumscribes said base portion of said support member about the second axis and terminates substantially on the imaginary plane to define a cut-out portion located entirely within a fishing line play-out side with respect to the imaginary plane.

14. A spinning reel for fishing according to claim 13, wherein a thickness of said base portion of said support member is substantially equal to an amount by which said peripheral wall is erected and projects from the inner surface of said cover.

15. A spinning reel for fishing according to claim 13, wherein for two positions of said rotor relative to said spinning reel:

the imaginary plane constitutes a first imaginary plane;

an imaginary second plane extends along the first axis and through a leg portion of said spinning reel as a plane of symmetry that bisects said spinning reel, including said rotor into substantially symmetrical halves, and the imaginary first plane extends perpendicularly to the imaginary second plane.

* * * * *